(12) United States Patent
Seo et al.

(10) Patent No.: US 11,601,884 B2
(45) Date of Patent: Mar. 7, 2023

(54) ELECTRONIC DEVICE FOR PROVIDING MOBILE HOTSPOT AND METHOD OF OPERATING ELECTRONIC DEVICE TO PROVIDE MOBILE HOTSPOT

(71) Applicant: Samsung Electronics Co., Ltd., Suwon-si (KR)

(72) Inventors: Jungkuk Seo, Suwon-si (KR); Seungjae Lee, Suwon-si (KR); Hyundo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 16/988,549

(22) Filed: Aug. 7, 2020

(65) Prior Publication Data
US 2021/0045057 A1 Feb. 11, 2021

(30) Foreign Application Priority Data
Aug. 7, 2019 (KR) .................. 10-2019-0096372

(51) Int. Cl.
*H04W 52/02* (2009.01)
*H04W 4/80* (2018.01)

(52) U.S. Cl.
CPC ......... *H04W 52/0229* (2013.01); *H04W 4/80* (2018.02); *H04W 52/0216* (2013.01); *H04W 52/0235* (2013.01)

(58) Field of Classification Search
None
See application file for complete search history.

(56) References Cited

U.S. PATENT DOCUMENTS

| | | |
|---|---|---|
| 9,526,076 B1 | 12/2016 | Park |
| 2008/0132298 A1 | 6/2008 | Roh et al. |
| 2009/0131095 A1 | 5/2009 | Rofougaran |
| 2013/0223308 A1 | 8/2013 | Chandra et al. |
| 2014/0093078 A1 | 4/2014 | Kidd et al. |
| 2016/0041593 A1 | 2/2016 | Dharawat |
| 2016/0088567 A1 | 3/2016 | HomChaudhuri et al. |
| 2016/0150357 A1* | 5/2016 | Jung ............... H04W 4/80 455/41.1 |
| 2016/0365886 A1 | 12/2016 | Prendergast et al. |

(Continued)

FOREIGN PATENT DOCUMENTS

EP 3174320 A1 5/2017

OTHER PUBLICATIONS

WO 2019066863 A1, Intel Corp (Year: 2017).*

(Continued)

*Primary Examiner* — Walter J Divito

(57) ABSTRACT

According to an embodiment, an electronic device comprises a communication module and at least one processor. The at least one processor is configured to establish a first network connection with a first external electronic device via a first communication module of the communication module, identify a first distance between the electronic device and the first external electronic device, identify first state information about the first external electronic device, and control a reception module of the first communication module to remain in a sleep state during a sleep time identified based on the first state information and the first distance. Other various embodiments are possible as well.

20 Claims, 23 Drawing Sheets

(56) References Cited

U.S. PATENT DOCUMENTS

2018/0302768 A1 10/2018 Uchiyama
2019/0150093 A1 5/2019 Kweon et al.

OTHER PUBLICATIONS

International Search Report dated Oct. 20, 2020 in connection with International Patent Application No. PCT/KR2020/008930, 3 pages.
Written Opinion of the International Searching Authority dated Oct. 20, 2020 in connection with International Patent Application No. PCT/KR2020/008930, 5 pages.
European Patent Office, "Supplementary European Search Report," dated Jun. 6, 2022, in connection with European Patent Application No. 20849871.7, 10 pages.

* cited by examiner

ELECTRONIC DEVICE FOR PROVIDING MOBILE HOTSPOT AND METHOD OF OPERATING ELECTRONIC DEVICE TO PROVIDE MOBILE HOTSPOT

CROSS-REFERENCE TO RELATED APPLICATION

This application is based on and claims priority under 35 U.S.C. 119 to Korean Patent Application No. 10-2019-0096372 filed on Aug. 7, 2019 in the Korean Intellectual Property Office, the disclosure of which is herein incorporated by reference in its entirety.

BACKGROUND

1. Field

Various embodiments of the disclosure relate to an electronic device for providing a mobile hotspot and a method of operating the electronic device to provide a mobile hotspot.

2. Description of Related Art

The growth of technology has led to widespread use of smartphones, tablet PCs, or other network communication-supporting electronic devices. Thus devices that may create a hotspot to support network communication access for client devices are commonplace. A hotspot is a physical space where client devices may gain Internet access to network communication. Typically, hotspots may be created from routers connected with the Internet service provider.

An example method for creating hotspots is the mobile hotspot function of a mobile electronic device, which may support network communication of other electronic devices. The mobile hotspot function, which is one of the wireless router modes of mobile electronic devices, is technology that controls a mobile electronic device to work as a wireless router based on access point (AP) technology to allow access-permitted client devices to use network communication.

Legacy electronic devices supporting the mobile hotspot function may keep the reception module of the WI-FI communication module always on to receive data packets, search packets, and connection packets from client devices while there is a mobile hotspot connection established. Thus, legacy electronic devices end up consuming a lot of power even when no packets are transmitted/received to/from a client device.

The legacy electronic devices supporting the mobile hotspot function may send out packets with the maximum transmission power regardless of the distances from the client devices. In many mobile hotspot connections, client devices are positioned relatively close to electronic devices providing the mobile hotspots as compared with the maximum coverage. One or more client devices may be connected to an electronic device providing a mobile hotspot. Thus, transmitting packets with the maximum transmission power after a client device is connected may be inefficient and cause a lot of power consumption.

For a legacy electronic device supporting the mobile hotspot function to establish a hotspot connection, the user herself needs to turn on the mobile hotspot function of the electronic device and the client device. Thus, inconvenience results.

The above information is presented as background information only to assist with an understanding of the disclosure. No determination has been made, and no assertion is made, as to whether any of the above might be applicable as prior art with regard to the disclosure.

SUMMARY

According to an embodiment, there may be provided an electronic device for providing a mobile hotspot and a method for operating the electronic device to provide a mobile hotspot. The electronic device may control a reception module of a WI-FI communication module to remain in a sleep state based on the state of a client device and the distance from the client device. According to an embodiment, the electronic device may adjust the transmission power of signals based on the distance from the client device. According to an embodiment, the electronic device may authenticate the client device via out-of-band (OOB) communication, automatically activating the mobile hotspot function without the need for the user's input.

In accordance with various embodiments, an electronic device comprises a communication module and at least one processor. The at least one processor is configured to establish a first network connection with a first external electronic device via a first communication module of the communication module, identify a first distance between the electronic device and the first external electronic device, identify first state information about the first external electronic device, and control a reception module of the first communication module to remain in a sleep state during a sleep time identified based on the first state information and the first distance.

In accordance with various embodiments, a method performed by an electronic device comprises establishing a first network connection with a first external electronic device, identifying a first distance between the electronic device and the first external electronic device, identifying first state information about the first external electronic device, and controlling a reception module of a first communication module to remain in a sleep state during a sleep time identified based on the first state information and the first distance.

In accordance with various embodiments, an electronic device comprises a wireless-fidelity (WI-FI) communication module configured to support a first network communication, a BLUETOOTH low energy (BLE) communication module configured to support a second network communication and at least one processor configured to activate the WI-FI communication module based on activation of a mobile hotspot function, establish a first network connection with a first external electronic device via the WI-FI communication module, measure a distance between the electronic device and the first external electronic device, when the distance is equal to or less than a designated distance, control the BLE communication module to receive state information about the first external electronic device using the second network communication and control a reception module of the WI-FI communication module to have a sleep time of a first time based on the state information, and when the distance is greater than the designated distance, control the WI-FI communication module to receive the state information about the first external electronic device using the first network communication and control the WI-FI communication module to have the sleep time of a second time.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 18B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
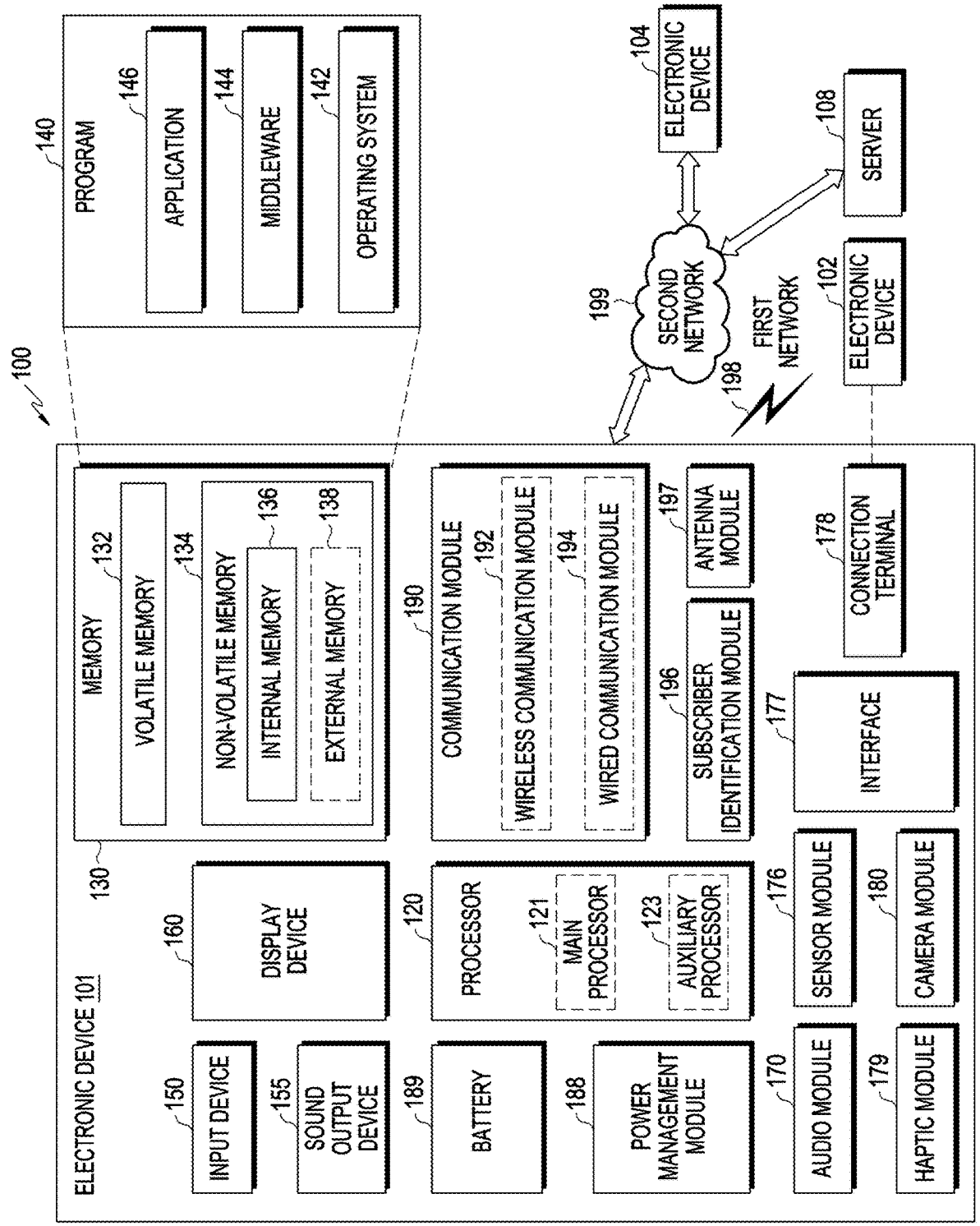
FIG. 1 illustrates a block diagram of an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
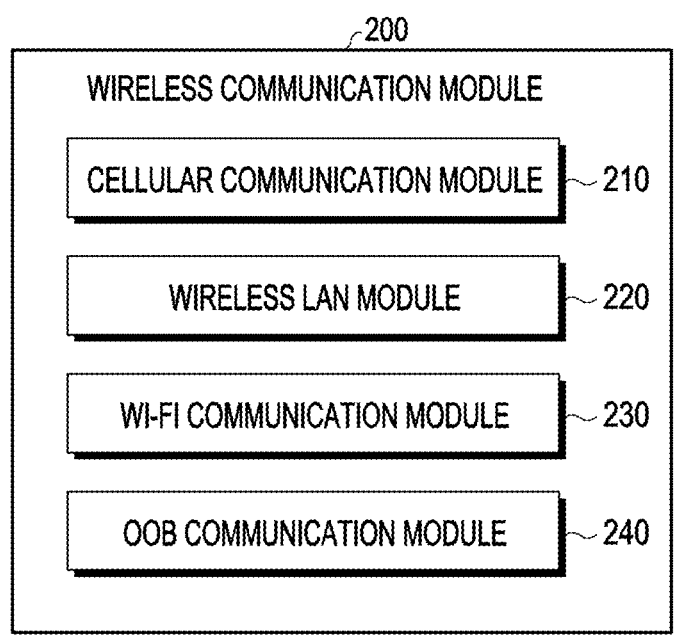
FIG. 2 illustrates a block diagram of a wireless communication module of an electronic device according to an embodiment.

FIG. 2 is a block diagram illustrating a wireless communication module of an electronic device according to an embodiment. According to an embodiment, a wireless communication module 200 (e.g., the wireless communication module 192) may include a cellular communication module 210, a wireless local area network (LAN) module 220, a WI-FI communication module 230, and an out-of-band (OOB) communication module 240. According to an embodiment, the OOB communication module 240 may include at least one of a BLUETOOTH communication module, a BLUETOOTH low energy (BLE) communication module, or a near-field communication (NFC) communication module.

Figure 3:
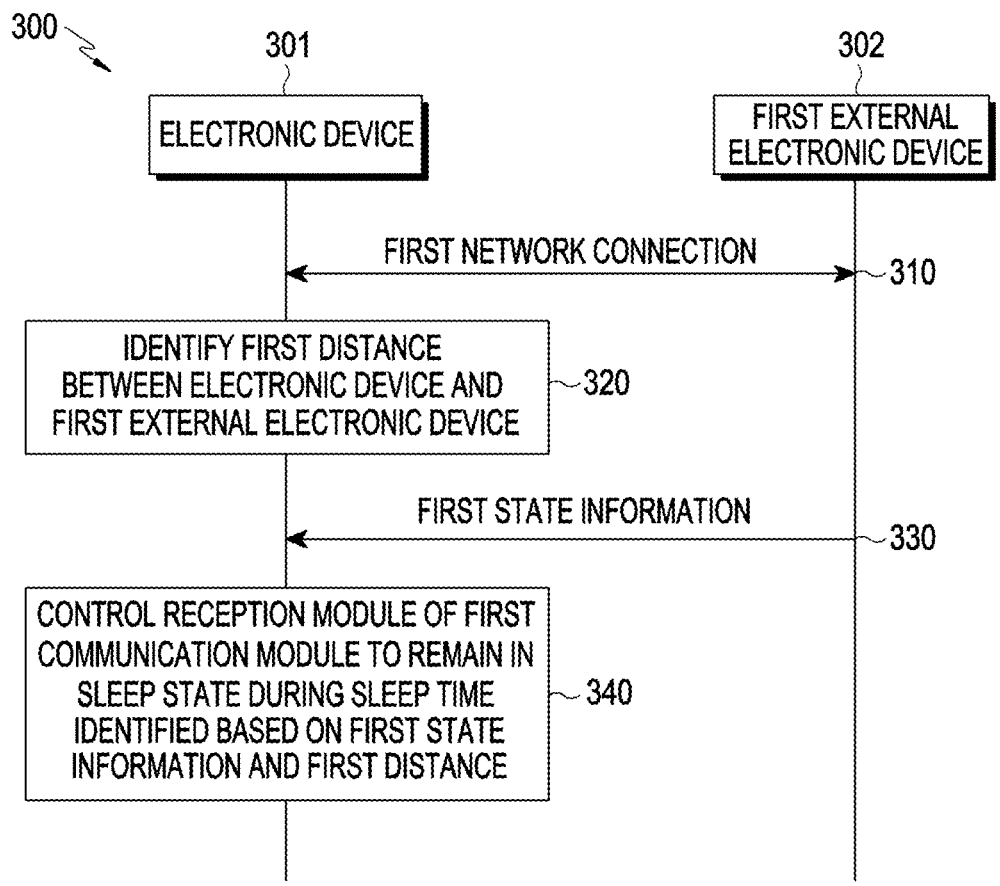
FIG. 3 illustrates a view of operations performed by an electronic device and a first external electronic device according to an embodiment.

FIG. 3 illustrates a view of operations 300 performed by an electronic device and a first external electronic device according to an embodiment. According to an embodiment, an electronic device 301 (e.g., the electronic device 101) may be an electronic device capable of creating a mobile hotspot. The electronic device 301 is not limited to a specific kind or type as long as it may create a mobile hotspot. According to an embodiment, a first external electronic device 302 may be a client device for performing network communication in a hotspot created by the electronic device 301. According to an embodiment, the first external electronic device 302 may be one of various kinds of electronic devices, such as smartphones, tablet PCs, laptop computers, smart speakers, or electronic books.

In operation 310, a processor (e.g., the processor 120) of the electronic device 301 may establish a first communication network with the first external electronic device 302 via a first communication module (e.g., the WI-FI communication module 230) of communication modules (e.g., the wireless communication module 200). According to an embodiment, the processor 120 of the electronic device 301 may include an application processor and/or a communication processor. According to an embodiment, the first network connection may be a connection via a mobile hotspot using a WI-FI network.

In operation 320, the processor 120 of the electronic device 301 may identify that the distance between the electronic device 301 and the first external electronic device 302 is a first distance. According to an embodiment, the processor 120 may identify the distance between the electronic device 301 and the first external electronic device 302 based on a round trip time interval (e.g., according to IEEE 802.11mc). According to an embodiment, the processor 120 may identify the distance between the electronic device 301 and the first external electronic device 302 based on the strength, e.g., received signal strength indication (RSSI), of a signal received via the first network connection. According to an embodiment, when a second network connection, which is an OOB network, such as a BLE network, is established between the electronic device 301 and the first external electronic device 302, the processor 120 may identify the distance between the electronic device 301 and the first external electronic device 302 based on the strength of the signal received from the first external electronic device 302 via the second network. For example, when the strength, e.g., the RSSI value, of the signal received from the first external electronic device 302 via the second network is less than a predetermined level, the retransmission count of the received signal is equal to or greater than a predetermined number, or the second network is disconnected, the processor 120 may identify that the distance between the electronic device 301 and the first external electronic device 302 is equal to or greater than a threshold distance corresponding to the coverage of the second network.

In operation 330, the processor 120 of the electronic device 301 may receive first state information regarding the first external electronic device 302 from the first external electronic device 302. According to an embodiment, the processor 120 of the electronic device 301 may receive the first state information via the WI-FI communication module 230 using the first network connection. According to an embodiment, the processor 120 of the electronic device 301 may receive the first state information via the OOB communication module 240 using the second network connection. According to an embodiment, the processor 120 of the electronic device 301 may compare the first distance, which is the distance between the electronic device 301 and the first external electronic device 302, with a threshold distance corresponding to the coverage of the second network and, when the first distance is less than the threshold distance, control the OOB communication module 240 to receive the first state information from the first external electronic device 302 via the second network connection. Alternatively, when the first distance is equal to or greater than the threshold distance, the processor 120 of the electronic device 301 may control the WI-FI communication module 230 to receive the first state information from the first external electronic device 302 via the first network connection.

According to an embodiment, the first state information regarding the first external electronic device 302 may include at least one of the amount of data transmitted/received between the electronic device 301 and the first external electronic device 302, information indicating whether the first external electronic device 302 is in the sleep state, movement information about the first external electronic device 302, information indicating the kind of an application running on the first external electronic device, or information indicating whether a user wearing the first external electronic device is asleep. According to an embodiment, the first state information regarding the first external electronic device 302 may indicate a single value or a value range indicating a sleep time allowed for the WI-FI communication module 230 of the electronic device 301, which is determined based on at least one of the amount of data transmitted/received between the electronic device 301 and the first external electronic device 302, information indicating whether the first external electronic device 302 is in the sleep state, movement information about the first external electronic device 302, information indicating the kind of an application running on the first external electronic device, or information indicating whether a user wearing the first external electronic device is asleep.

According to an embodiment, the WI-FI communication module 230 of the electronic device 301 may include a transmission module and a reception module. According to an embodiment, the processor 120 of the electronic device 301 may control at least one of the transmission module or reception module of the WI-FI communication module 230 to remain in a sleep state.

In operation 340, the processor 120 of the electronic device 301 may control the reception module of the WI-FI communication module 230 to remain in the sleep state during a sleep time identified based on the first state information and the first distance. According to an embodiment, in operation 340, the first state information and the first distance are received by the OOB communication module 240. The communication processor may identify the sleep time based on the first state information and the first distance and may then control the WI-FI communication module 230 to remain in the sleep state during the identified sleep time without going through the application processor. According to an embodiment, the first state information and the first distance are received by the OOB communication module 240. The application processor may identify the sleep time based on the first state information and the first distance and may then control the WI-FI communication module 230 to remain in the sleep state during the identified sleep time.

According to an embodiment, when the first state information regarding the first external electronic device 302 includes at least one of the amount of data transmitted/received between the electronic device 301 and the first external electronic device 302, information indicating whether the first external electronic device 302 is in the sleep state, movement information about the first external electronic device 302, information indicating the kind of an application running on the first external electronic device, 302 or information indicating whether a user wearing the first external electronic device 302 is asleep, the processor 120 of the electronic device 301 may identify the sleep time allowed for the state of the first external electronic device 302 based on the received first state information and, when the sleep time allowed for the state of the first external electronic device 302 is equal to or less than the maximum sleep time identified based on the first distance, identify that the sleep time allowed for the state of the first external electronic device 302 is the final sleep time. When the sleep time allowed for the state of the first external electronic device 302 exceeds the maximum sleep time identified based on the first distance, the processor 120 of the electronic device 301 may identify that the maximum sleep time identified based on the first distance is the final sleep time.

According to an embodiment, in a case where the first state information regarding the first external electronic device 302 indicates a single value indicating the sleep time allowed for the reception module of the WI-FI communication module 230 of the electronic device 301, when the sleep time indicated by the first state information is equal to or less than the maximum sleep time identified based on the first distance, the processor 120 of the electronic device 301 may identify that the sleep time indicated by the first state information is the final sleep time. When the sleep time indicated by the first state information exceeds the maximum sleep time identified based on the first distance, the processor 120 of the electronic device 301 may identify that the maximum sleep time identified based on the first distance is the final sleep time.

According to an embodiment, in a case where the first state information regarding the first external electronic device 302 indicates a value range indicating the sleep time allowed for the reception module of the WI-FI communication module 230 of the electronic device 301, when the maximum value of the sleep time range indicated by the first state information exceeds the maximum sleep time identified based on the first distance, the processor 120 of the electronic device 301 may identify that the maximum sleep time identified based on the first distance is the final sleep time. Or, when the maximum value of the sleep time range indicated by the first state information is equal to or less than the maximum sleep time identified based on the first distance, the processor 120 of the electronic device 301 may identify that the maximum value of the sleep time range indicated by the first state information is the final sleep time.

According to an embodiment, the sleep time may be a time within a designated period. The processor 120 may be in the sleep state during the sleep time within the designated period and, during the rest of the sleep time, control the reception module of the WI-FI communication module 230 to be in a wake up state. According to an embodiment, the designated period may be 100 ms.

Figure 4A:
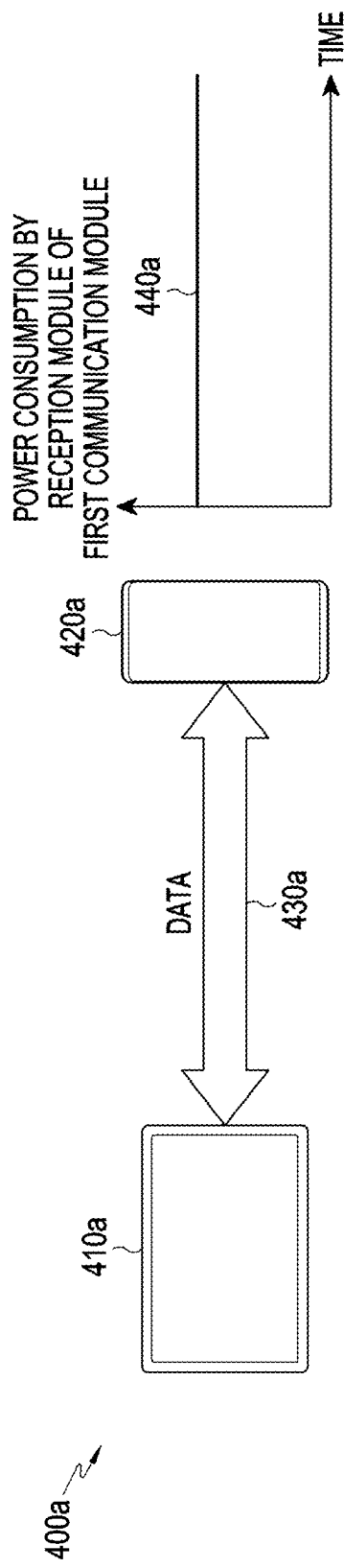
FIGS. 4A, 4B, and 4C illustrate views of an example of adjusting a sleep time according to an embodiment.
Figure 4B:
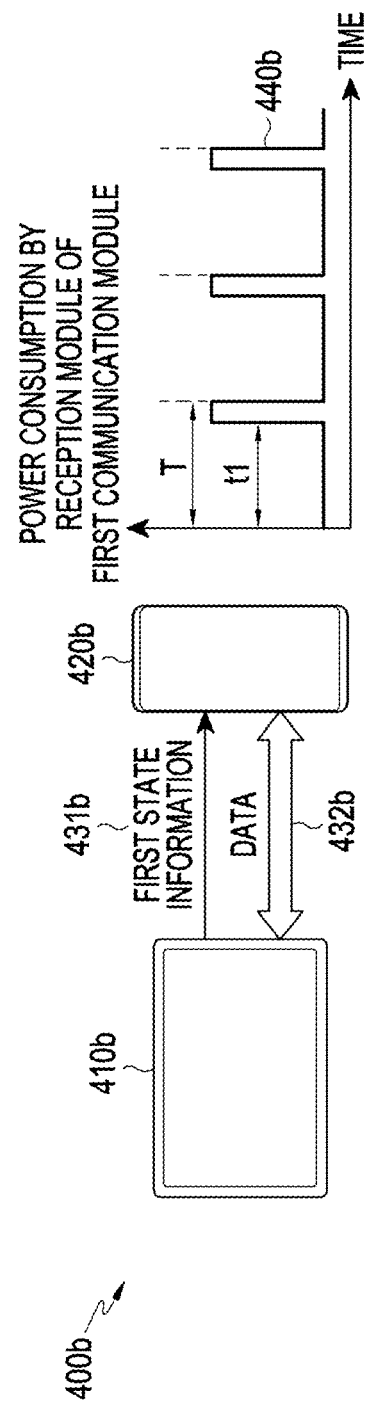
Figure 4C:
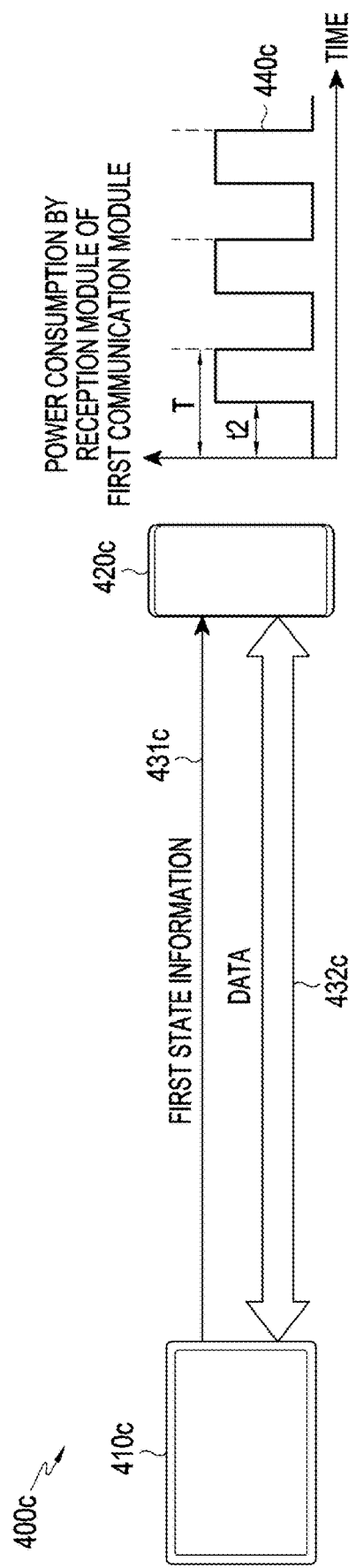

FIGS. 4A, 4B, and 4C illustrate views of an example of adjusting a sleep time according to an embodiment. Specifically, FIG. 4A illustrates an example in which the sleep time is 0 according to a comparative example for comparison with an embodiment of the disclosure. FIG. 4B illustrates an example in which the first distance between the electronic device and the first external electronic device is less than a threshold distance. FIG. 4C illustrates an example in which the first distance is equal to or greater than the threshold distance.

In the example environment 400a of FIG. 4A, an electronic device 420a (e.g., the electronic device 101) may be an electronic device capable of creating a mobile hotspot. A first external electronic device 410a may be a client device for performing network communication in the hotspot created by the electronic device 420a. The details of the electronic device 301 and first external electronic device 302 described above in connection with FIG. 3 may apply likewise to the electronic device 420a and first external electronic device 410a of FIG. 4A, an electronic device 420b and first external electronic device 410b of FIG. 4B, and an electronic device 420c and first external electronic device 410c of FIG. 4C described below.

In the example environment 400a of FIG. 4A, a processor (e.g., the processor 120) of the electronic device 420a may transmit/receive data 430a to/from the first external electronic device 410a through a first communication module (e.g., the WI-FI communication module 230), using a first network connection. In this case, power 440a consumed by the reception module of the first communication module (e.g., the WI-FI communication module 230) may not be controlled based on the amount of data 430a transmitted/received on the first network connection or information regarding the state of the first external electronic device 410a. Thus, the power 440a consumed by the reception module of the first communication module (e.g., the WI-FI communication module 230) of the electronic device 420a may be higher than in the cases described below with reference to FIG. 4B or 4C.

In the example environment 400b of FIG. 4B, the processor 120 of the electronic device 420b may transmit/receive data 432b to/from the first external electronic device 410b through a first communication module (e.g., the WI-FI communication module 230), using a first network connection. The first external electronic device 410b may be positioned less than a threshold distance away from the electronic device 420b. In this case, the processor 120 of the electronic device 420a may control the OOB communication module 240 to receive the first state information 431b from the first external electronic device 410b via the second network connection. The second network connection may be, e.g., a BLE connection.

According to an embodiment, the processor 120 of the electronic device 420b may control the reception module of the first communication module (e.g., the WI-FI communication module 230) to remain in the sleep state during time t1 within period T and remain awake during the rest of period T, based on the first state information 431b received from the first external electronic device 410b via the second network connection. In this case, the power 440b consumed by the reception module of the first communication module may remain at a low value during time t1 within period T and, only during the rest of period T, may be the same as a constant power value maintained in FIG. 4A. According to an embodiment, the length of sleep time t1 during which the reception module of the first communication module remains in the sleep state may be varied depending on the first state information 431b. Sleep time t1 shown in FIG. 4B may be the maximum sleep time when the state information is received via BLE communication. For example, the electronic device 101 may determine sleep time t1 based on the first state information 431b and may determine the maximum sleep time t1 based on the first state information 431b being information allowing the maximum sleep time. According to an embodiment, as described below with reference to FIG. 4C, the maximum sleep time t1 when the state information is received via BLE communication may be larger than the maximum sleep time t2 when the state information is received via WI-FI communication.

In the example environment 400c of FIG. 4C, the processor 120 of the electronic device 420c may transmit/receive data 432c to/from the first external electronic device 410c through a first communication module (e.g., the WI-FI communication module 230), using a first network connection. The first external electronic device 410c may be positioned a threshold distance or more away from the electronic device 420c. In this case, the processor 120 of the electronic device 420c may control the first communication module to receive the first state information 431c from the first external electronic device 410c via the first network connection.

According to an embodiment, the processor 120 of the electronic device 420c may control the reception module of the first communication module (e.g., the WI-FI communication module 230) to remain in the sleep state during time t2 within period T and remain awake during the rest of period T, based on the first state information 431c received from the first external electronic device 410c via the first network connection. In this case, the power 440c consumed by the reception module of the first communication module may remain at a low value during time t2 within period T and, only during the rest of period T, may be the same as a constant power value maintained in FIG. 4A. According to an embodiment, the length of sleep time t2 during which the reception module of the first communication module remains in the sleep state may be varied depending on the first state information 431c. Sleep time t2 shown in FIG. 4C may be the maximum sleep time when the state information is received via WI-FI communication. For example, the electronic device 101 may determine sleep time t2 based on the first state information 431c and may determine the maximum sleep time t2 based on the first state information 431c being information allowing the maximum sleep time.

Comparison between the power 440b of FIG. 4B and the power 440c of FIG. 4C reveals that the maximum sleep time t2 when the state information is received via WI-FI communication is shorter than the maximum sleep time t1 when the state information is received via BLE communication. In the case shown in FIG. 4C, the electronic device 420c receives the first state information 431c from the first external electronic device 410c via the first network connection. Thus, as compared with the case of FIG. 4B, in which the first state information 431b is received via the second network connection, the reception module of the first communication module of FIG. 4C is required to remain awake for a longer time.

Figure 5A:
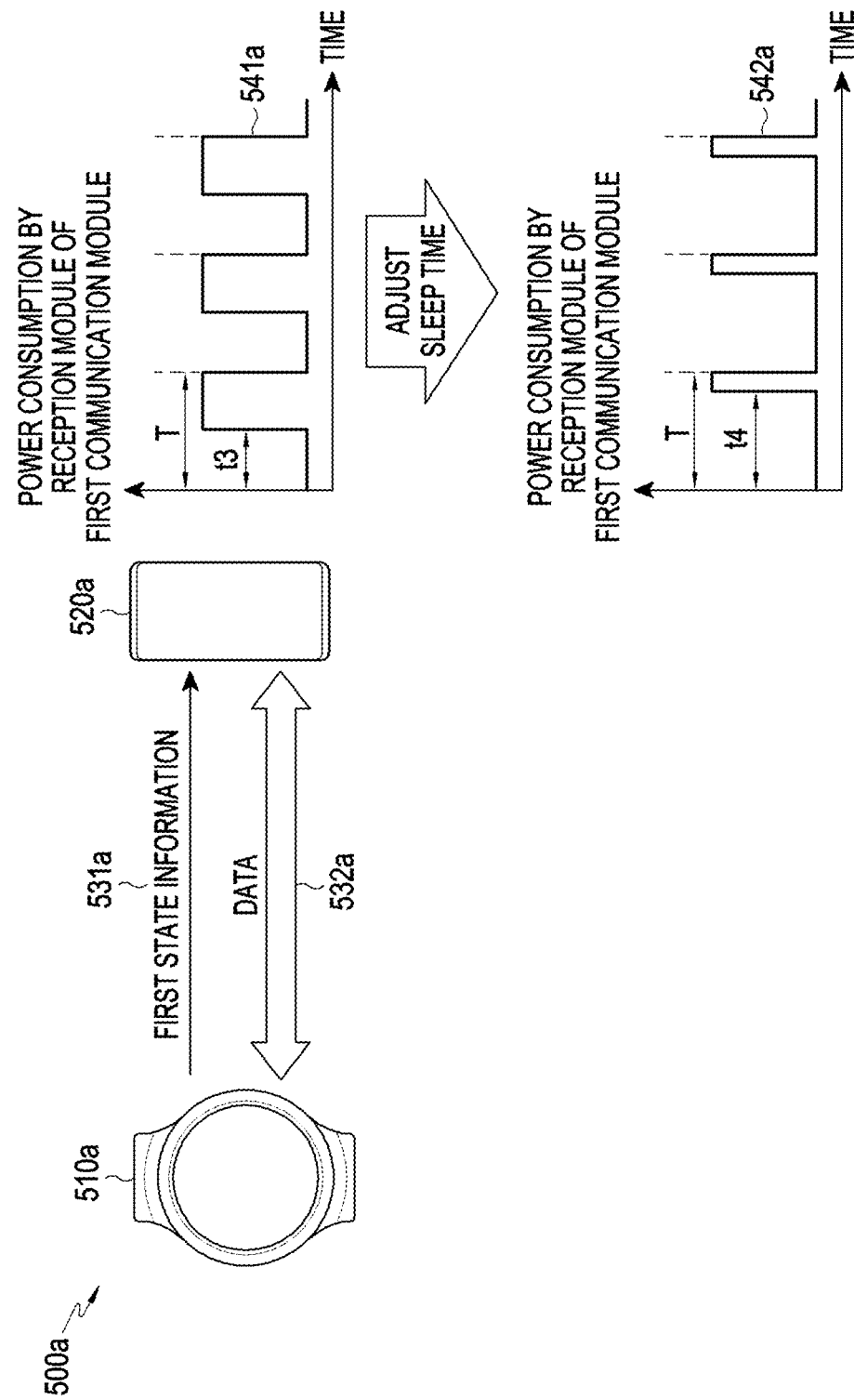
FIG. 5A illustrates a view of an example of adjusting a sleep time according to an embodiment.

FIG. 5A illustrates a view of an example of adjusting a sleep time according to an embodiment. Specifically, FIG. 5A illustrates an example of adjusting the sleep time in an embodiment where the first state information of FIG. 5A includes information indicating whether the user is asleep. In the example environment 500a of FIG. 5A, a first external electronic device 510a may be a wearable device. A processor (e.g., the processor 120) of the electronic device 520a may transmit/receive data 532a to/from the first external electronic device 510a through a first communication module (e.g., the WI-FI communication module 230), using a first network connection. The processor 120 of the electronic device 520a may control the wireless communication module (e.g., the wireless communication module 200) to receive the first state information 531a including the information indicating whether the user wearing the first external electronic device 510a is asleep from the first external electronic device 510a via the first network connection or second network connection. According to an embodiment, the second network connection may be, e.g., a BLE connection.

According to an embodiment, when the first state information 531a indicates that the user wearing the first external electronic device 510a is asleep, the processor 120 of the electronic device 520a may control the reception module of the first communication module. Specifically, the power 541a consumed by the reception module of the first communication module before the first state information 531a is received may remain at a relatively low value during time t3 within period T and, during the rest of period T, may remain at a relatively high value. In contrast, after receiving the first state information 531a, the processor 120 of the electronic device 520a may control the reception module of the first communication module to allow the power 542a consumed by the reception module of the first communication module to remain at a relatively low value during time t4 which is larger than t3, within period T and to remain at a relatively high value only during the rest of period T. When the user wearing the first external electronic device 510a is asleep, transmission/reception of the data 532a between the first external electronic device 510a and the electronic device 520a using the first network connection is less likely. Thus, the reception module of the first communication module may remain longer in the sleep state. According to an embodiment, when the first state information 531a is received via the first network connection, t4 may be the maximum sleep time allowed by the first network connection. In another example, when the first state information 531a is received via the second network connection, t4 may be the maximum sleep time allowed by the second network connection. As described above in connection with FIGS. 4B and 4C, the maximum sleep time of the reception module of the first communication module allowed by the first network connection may be shorter than the maximum sleep time of the reception module of the first communication module allowed by the second network connection.

Figure 5B:
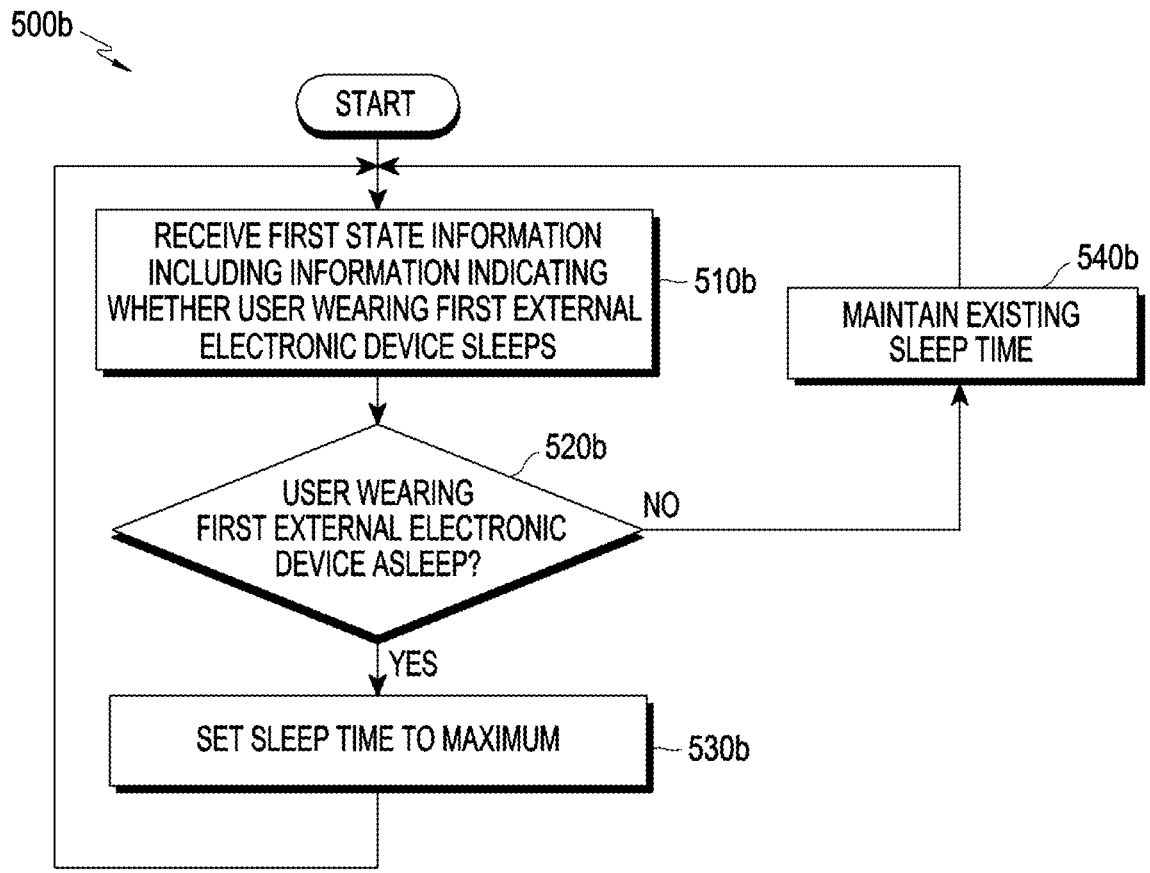
FIG. 5B illustrates a flowchart of operations of an electronic device according to an embodiment.

FIG. 5B illustrates a flowchart of operations of an electronic device 520a according to an embodiment. Specifically, the operations 500b of FIG. 5B are operations for adjusting the sleep time by a processor (e.g., the processor 120) of the electronic device 520a in an embodiment where first state information as shown in FIG. 5A includes information indicating whether the user is asleep.

In operation 510b, the processor 120 of the electronic device 520a may receive first state information 531a including information indicating whether the user wearing the first external electronic device 510a is asleep from the first external electronic device 510a. According to an embodiment, the processor 120 of the electronic device 520a may receive the first state information 531a via a first communication module (e.g., the WI-FI communication module 230) using a first network connection. According to an embodiment, the processor 120 of the electronic device 520a may receive the first state information 531a via a second communication module (e.g., the OOB communication module 240) using a second network connection. According to an embodiment, the first external electronic device 510a may periodically transmit the first state information 531a to the electronic device 520a. According to an embodiment, the first state information 531a may be transmitted from the first external electronic device 510a in response to a request transmitted from the electronic device 520a to the first external electronic device 510a. According to an embodiment, the request transmitted from the electronic device 520a to the first external electronic device 510a may include the period of transmission of the first state information 531a.

In operation 520b, the processor 120 of the electronic device 520a may identify whether the user wearing the first external electronic device 510a is asleep based on the first state information 531a.

In operation 520b, upon identifying that the user wearing the first external electronic device 510a is not asleep (no in 520b), the processor 120 of the electronic device 520a may maintain the existing sleep time in operation 540b and, until the user wearing the first external electronic device 510a is identified to be asleep, repeat operations 510b and 520b.

In operation 520b, upon identifying that the user wearing the first external electronic device 510a is asleep (yes in 520b), the processor 120 of the electronic device 520a may control the reception module of the first communication module 230 so that the sleep time of the reception module of the first communication module 230 is the maximum in operation 530b. According to an embodiment, as described above in connection with FIGS. 4B and 4C, the maximum sleep time of the reception module of the first communication module 230 may be varied depending on whether the first state information 531a is received via the first communication module 230 using the first network connection or via the second communication module 240 using the second network connection.

Figure 6:
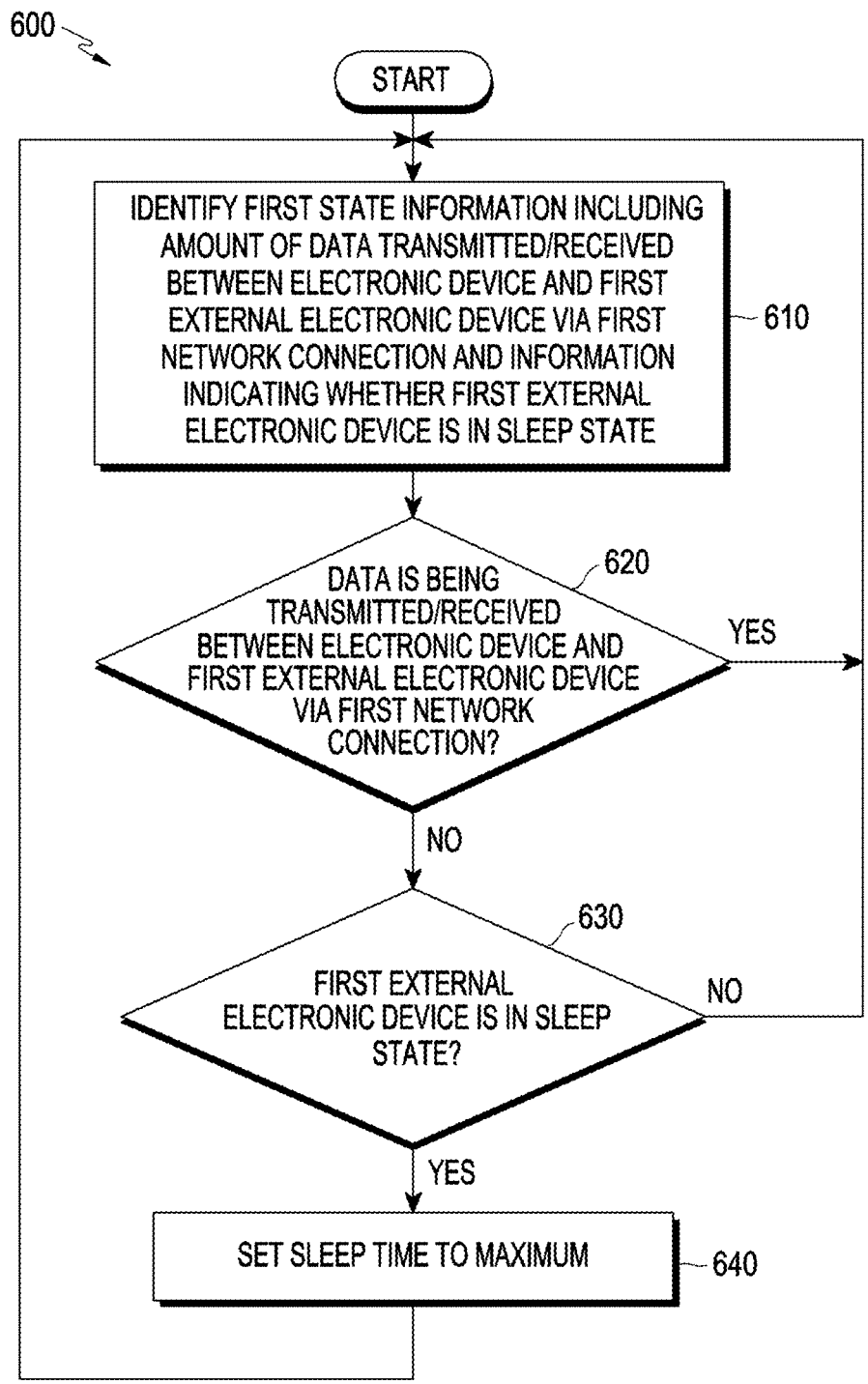
FIG. 6 illustrates a flowchart of operations of an electronic device according to an embodiment.

FIG. 6 illustrates a flowchart of operations of an electronic device (e.g., the electronic device 301 of FIG. 1) according to an embodiment. Specifically, the operations 600 of FIG. 6 are operations for adjusting the sleep time by a processor (e.g., the processor 120) of the electronic device 301 in an embodiment where first state information includes information indicating whether a first external electronic device (e.g., the first external electronic device 302 of FIG. 3) is in the sleep state and the amount of data transmitted/received between the electronic device 301 and the first external electronic device 302 via a first network connection.

In operation 610, the processor 120 of the electronic device 301 may identify the first state information including the information indicating whether the first external electronic device 302 is in the sleep state and the amount of data transmitted/received between the electronic device 301 and the first external electronic device 302 via the first network connection, from the first external electronic device 302. According to an embodiment, the processor 120 of the electronic device 301 may receive the first state information via a first communication module (e.g., the WI-FI communication module 230) using the first network connection. According to an embodiment, the processor 120 of the electronic device 301 may receive the first state information via a second communication module (e.g., the OOB communication module 240) using the second network connection. As described above in connection with FIGS. 4B and 4C, when the electronic device 301 receives the first state information via the second communication module 240 using the second network connection, the maximum sleep time may be larger than when the first state information is received via the first communication module 230 using the first network connection as described below in connection with operation 640 and, thus, power consumption may be saved.

According to an embodiment, the information indicating whether the first external electronic device 302 is in the sleep state may include information indicating whether the display of the first external electronic device 302 is in the off state.

According to an embodiment, the processor 120 of the electronic device 301 may receive information indicating whether the first external electronic device 302 is in the sleep state and the first state information via the first communication module 230 or the second communication module 240. According to an embodiment, the processor 120 of the electronic device 301 may receive the information indicating whether the first external electronic device 302 is in the sleep state via the first communication module 230 or the second communication module 240 and may identify the amount of data transmitted/received between the electronic device 301 and the first external electronic device 302 through the first network connection, via the first communication module 230, rather than receiving information about the amount of transmitted/received data from the first external electronic device 302.

In operation 620, the processor 120 of the electronic device 301 may identify whether data is transmitted/received between the electronic device 301 and the first external electronic device 302 via the first network connection based on the amount of data transmitted/received between the electronic device 301 and the first external electronic device 302 via the first network connection.

In operation 620, upon identifying that data is transmitted/received between the electronic device 301 and the first external electronic device 302 via the first network connection, the processor 120 of the electronic device 301 may maintain the existing sleep time and may repeat operations 610 and 620 until it is identified that no data is transmitted/received between the electronic device 301 and the first external electronic device 302 via the first network connection.

In operation 620, upon identifying that no data is transmitted/received between the electronic device 301 and the first external electronic device 302 via the first network connection, the processor 120 of the electronic device 301 may identify whether the first external electronic device 302 is in the sleep state in operation 630.

In operation 630, upon identifying that the first external electronic device 302 is not in the sleep state, the processor 120 of the electronic device 301 may repeat operations 610, 620, and 630 until no data is transmitted/received between the electronic device 301 and the first external electronic device 302 via the first network connection and the first external electronic device 302 is identified to be in the sleep state.

In operation 630, upon identifying that the first external electronic device 302 is in the sleep state, the processor 120 of the electronic device 301 may control the reception module of the first communication module so that the sleep time of the reception module of the first communication module is the maximum in operation 640. According to an embodiment, as described above in connection with FIGS. 4B and 4C, the maximum sleep time of the reception module of the first communication module may be varied depending on whether the first state information 531a is received via the first communication module using the first network connection or via the second communication module using the second network connection.

In the example described above in connection with FIGS. 5A and 5B, the first state information includes the information indicating whether the user is asleep. In the example described above in connection with FIG. 6, the first state information includes the information indicating whether the first external electronic device is in the sleep state and the amount of data transmitted/received between the electronic device and the first external electronic device via the first network connection. However, the information that may be included in the first state information is not limited to the examples described above in connection with FIGS. 5A, 5B, and 6.

According to an embodiment, the first state information may include movement information about the first external electronic device 302. In this case, when the degree of movement of the first external electronic device 302 is a preset level or more, the first external electronic device 302 is moving and, thus, the use of the first network connection may be less likely to be required. Thus, upon identifying that the degree of movement of the first external electronic device 302 is the preset level or more based on the movement information about the first external electronic device 302, the processor 120 of the electronic device 301 may control the reception module of the first communication module (e.g., the WI-FI communication module 230) to remain in the sleep state during a specific sleep time.

According to an embodiment, the first state information may include the amount of data transmitted/received between the electronic device 301 and the first external electronic device 302. In this case, when the amount of data currently transmitted/received between the electronic device 301 and the first external electronic device 302 via the first network connection is less than a predetermined level, the processor 120 of the electronic device 301 may control the reception module of the first communication module (e.g., the WI-FI communication module 230) to remain in the sleep state during the specific sleep time. In another example, when the first state information includes the amount of data transmitted/received between the electronic device 301 and the first external electronic device 302 via the first network connection, the processor 120 of the electronic device 301 may identify the recent data usage of the first external electronic device 302 based on the first state information and, when the recent data usage of the first external electronic device 302 is less than the predetermined level, control the reception module of the first communication module (e.g., the WI-FI communication module 230) to remain in the sleep state during the specific sleep time.

According to an embodiment, the first state information may include information indicating the kind of an application running on the first external electronic device 302. In this case, the processor 120 of the electronic device 301 may identify whether the application running on the first external electronic device 302 is an application expected to request data transmission/reception via the first network connection. For example, when a phone application is running on the first external electronic device 302, the first external electronic device 302 may be expected not to request data transmission/reception via the first network connection, and the processor 120 of the electronic device 301 may control the reception module of the first communication module (e.g., the WI-FI communication module 230) to remain in the sleep state with a designated period. According to an embodiment, the processor 120 of the electronic device 301 may perform control to vary the sleep time depending on the amount of data transmitted/received via the first network connection, expected to be requested by the application running on the first external electronic device 302. For example, for a messenger application running on the first external electronic device 302, the sleep time may be set to be longer since the messenger application typically performs communication via text and thus uses less data. According to an embodiment, information regarding past data usage on the first external electronic device 302 corresponding to the application running on the first external electronic device 302, along with the information indicating the kind of the application running on the first external electronic device 302, may be included in the first state information.

According to an embodiment, the first state information may include information indicating at least one pattern of the time during which the user uses the first external electronic device 302, the time during which the first external electronic device 302 uses data via the first network connection, the amount of data used by the first external electronic device 302, or the location of the first external electronic device 302 when the first external electronic device 302 uses data via the first network connection.

According to an embodiment, the first state information may include information indicating the size of data scheduled to be downloaded or the size of data being downloaded via the first network connection.

According to an embodiment, the first state information may include any combination of the above-described kinds of information. For example, the first state information may include information indicating whether the first external electronic device 302 is in the sleep state and information indicating the kind of the application running on the first external electronic device 302. In this case, although the first external electronic device 302 is identified to be in the sleep state, if the application running on the first external electronic device 302 is an application needing much data transmission/reception, the processor 120 of the electronic device 301 may control the reception module of the first communication module (e.g., the WI-FI communication module 230) not to enter the sleep state or, only during the sleep time, enter the sleep state.

Although the kinds of information that may be included in the first state information are enumerated above, the information that may be included in the first state information is not limited thereto. It will be easily appreciated by one of ordinary skill in the art that the first state information is not limited to specific kinds of information as long as it may be related to use of the first network connection of the first external electronic device 302.

Figure 7:
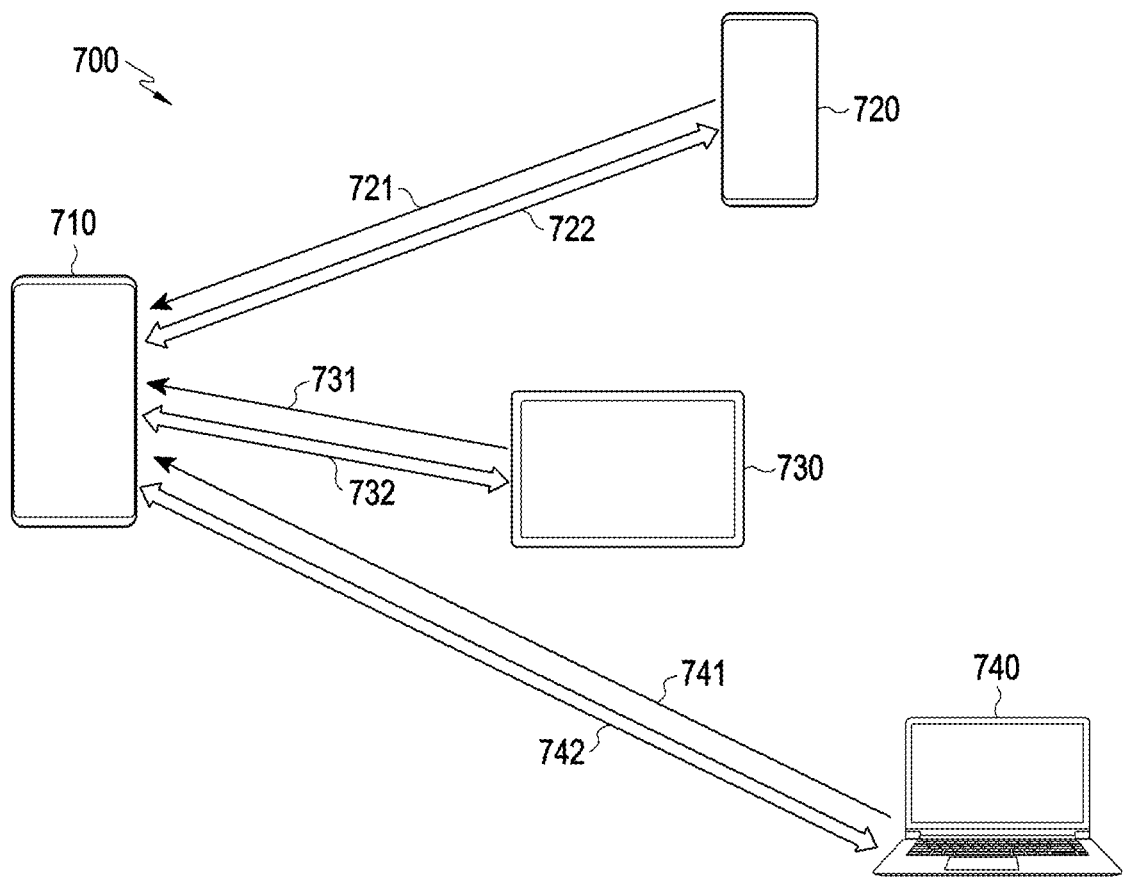
FIG. 7 illustrates a view of an electronic device connected with a plurality of external electronic devices according to an embodiment.

FIG. 7 illustrates a view of an electronic device connected with a plurality of external electronic devices according to an embodiment. In the example environment 700 of FIG. 7, an electronic device 710 (e.g., the electronic device 101) may be an electronic device capable of creating a mobile hotspot. A first external electronic device 720, a second external electronic device 730, and a third external electronic device 740 may be client devices for performing network communication in a hotspot created by the electronic device 710.

A processor (e.g., the processor 120) of the electronic device 710 may transmit/receive data 722 to/from the first external electronic device 720 using a first network connection, via the first communication module (e.g., the WI-FI communication module 230), data 732 to/from the second external electronic device 730, and data 742 to/from the third external electronic device 740. The processor 120 of the electronic device 710 may control the wireless communication module (e.g., the wireless communication module 200) to receive first state information 721 from the first external electronic device 720 via the first network connection or second network connection, first state information 731 from the second external electronic device 730 via the first network connection or second network connection, and first state information 741 from the third external electronic device 740 via the first network connection or second network connection. According to an embodiment, the second network connection may be, e.g., a BLE connection.

Figure 8:
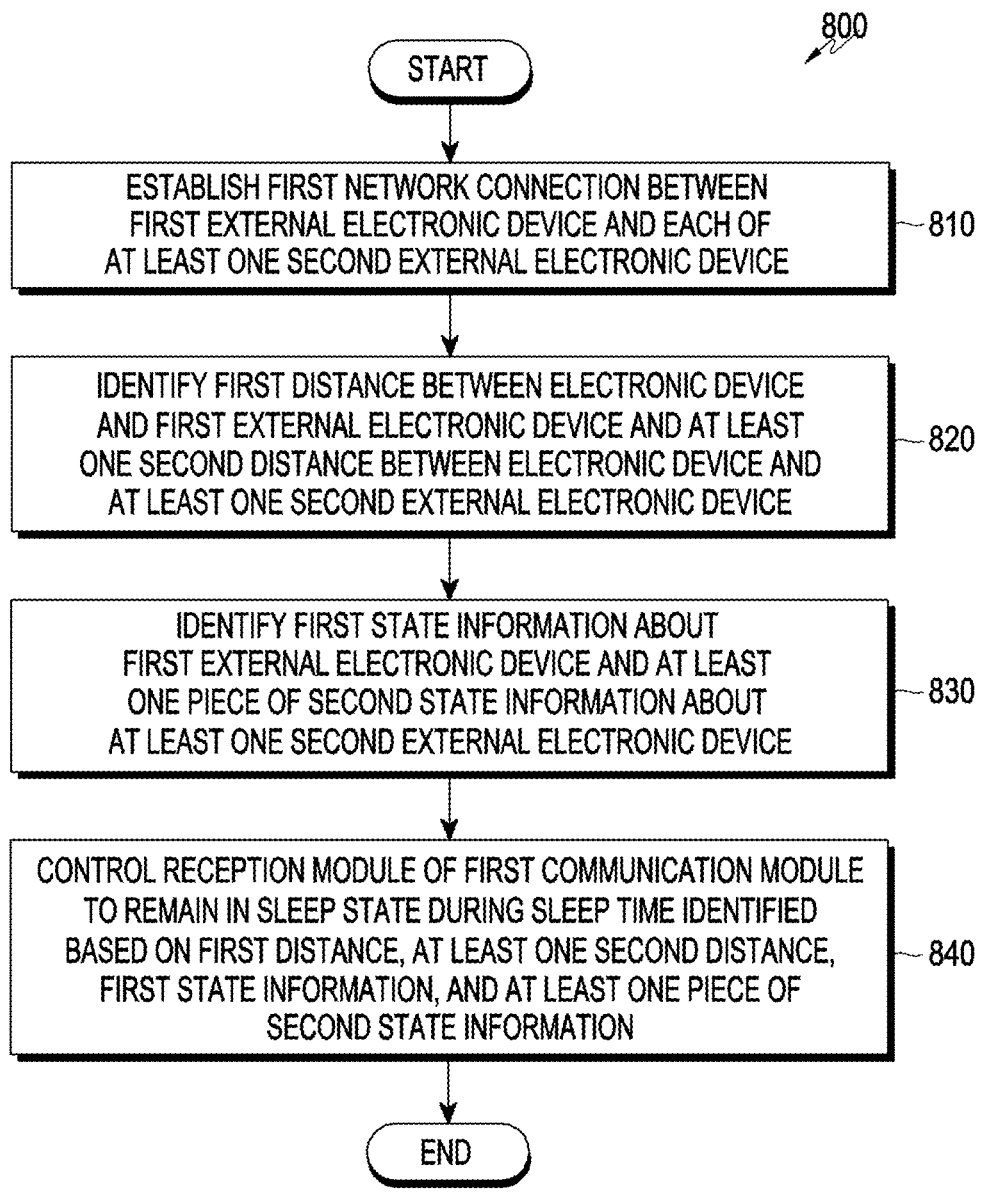
FIG. 8 illustrates a flowchart of operations of an electronic device according to an embodiment.

FIG. 8 illustrates a flowchart of operations of an electronic device according to an embodiment. Specifically, the operations 800 of FIG. 8 are operations for adjusting the sleep time by a processor (e.g., the processor 120) of an electronic device in an embodiment where the electronic device capable of creating a mobile hotspot is connected with a plurality of external electronic devices as shown in FIG. 7.

In operation 810, the processor (e.g., the processor 120) of the electronic device (e.g., the electronic device 101) may establish a first network connection with each of a first external electronic device (e.g., the first external electronic device 720 of FIG. 7) and at least one second external electronic device (e.g., the second external electronic device 730 or the third external electronic device 740) via the first communication module (e.g., the WI-FI communication module 230) among communication modules (e.g., the wireless communication module 200).

In operation 820, the processor 120 of the electronic device 101 may identify a first distance, which is the distance between the electronic device 101 and the first external electronic device, and at least one second distance between the electronic device 101 and at least one second external electronic device. The operation of identifying the first distance described above in connection with operation 320 of FIG. 3 may be applied to operation 820 in the same or similar manner, and no repetitive description thereof is given below.

In operation 830, the processor 120 of the electronic device 101 may identify first state information about the first external electronic device and at least one piece of second state information about the at least one second external electronic device. The operation of identifying the first state information described above in connection with operation 330 of FIG. 3 may be applied to operation 830 in the same or similar manner, and no repetitive description thereof is given below.

In operation 840, the processor 120 of the electronic device 101 may control the reception module of the first communication module to remain in the sleep state during a sleep time identified based on the first distance, at least one second distance, first state information, and at least one piece of second state information. Specifically, the processor 120 of the electronic device 101 may identify a first sleep time allowed by the first external electronic device based on the first distance and the first state information and at least one second sleep time allowed by the at least one second external electronic device based on the at least one second distance and the at least one piece of second state information, identify that the shortest one of the first sleep time and the at least one second sleep time is the sleep time, and control the reception module of the first communication module to remain in the sleep state during the identified sleep time.

According to an embodiment, the processor 120 of the electronic device 101 may keep the period when the reception module of the first communication module enters the sleep state identical regardless of the number of the second external electronic devices and may control the reception module of the first communication module to remain in the sleep state during the sleep time determined depending on the first distance, second distance, first state information, and at least one piece of second state information.

According to an embodiment, the processor 120 of the electronic device 101 may control the reception module of the first communication module to remain in the sleep state, receive the first state information and at least one piece of second state information via the second network connection, and upon identifying that the reception module of the first communication module needs to wake up based on at least one of the first state information or at least one piece of second state information, control the reception module of the first communication module to wake up.

Figure 9:
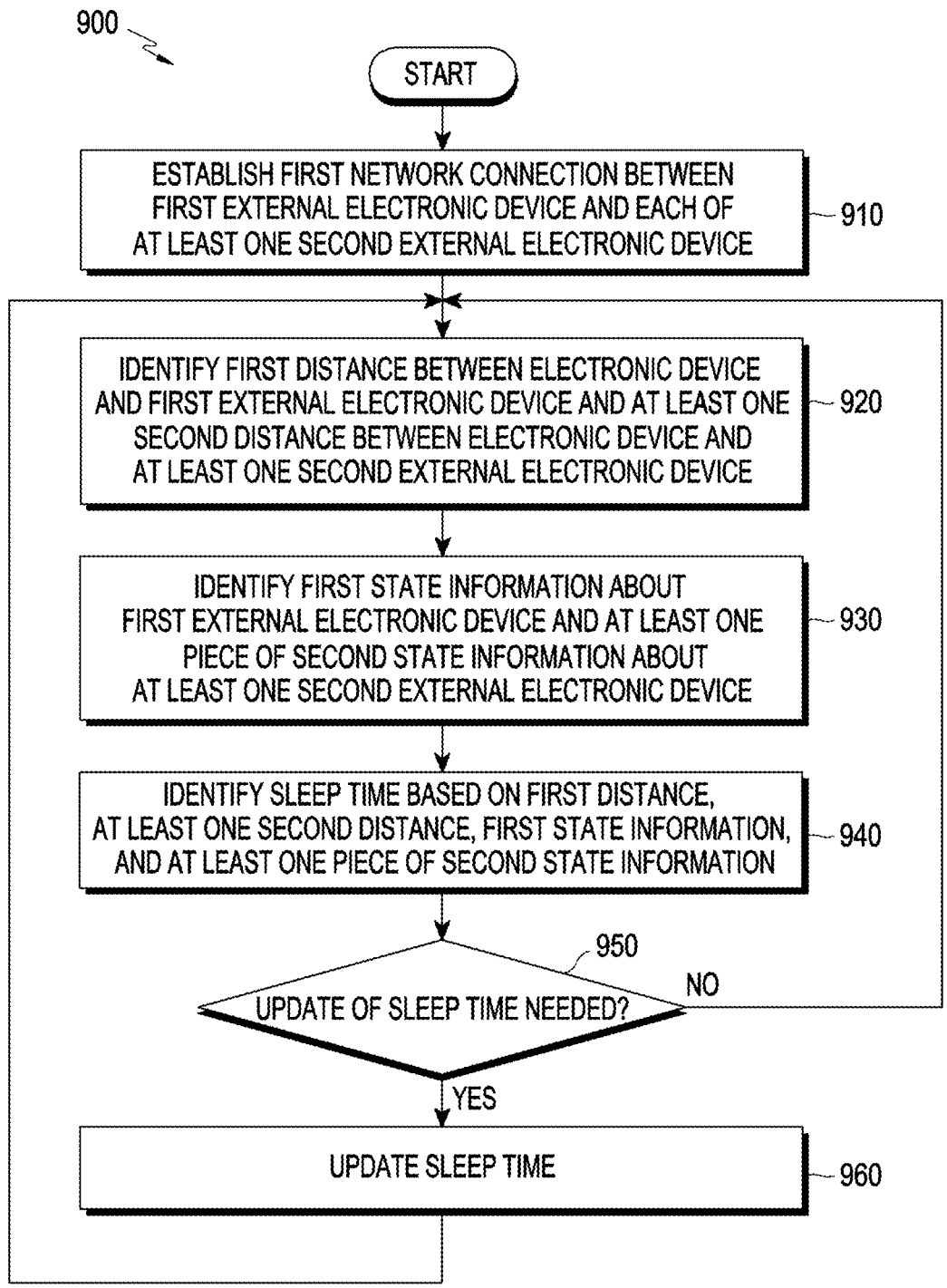
FIG. 9 illustrates a flowchart of operations of an electronic device according to an embodiment.

FIG. 9 illustrates a flowchart of operations of an electronic device according to an embodiment. Specifically, the operations 900 of FIG. 9 are operations for steadily updating the sleep time by a processor (e.g., the processor 120) of an electronic device in an embodiment where the electronic device (e.g., the electronic device 101) capable of creating a mobile hotspot is connected with a plurality of external electronic devices.

In operation 910, the processor (e.g., the processor 120) of the electronic device (e.g., the electronic device 101) may establish a first communication network with a first external electronic device and at least one second external electronic device via a first communication module (e.g., the WI-FI communication module 230) of communication modules (e.g., the wireless communication module 200).

In operation 920, the processor 120 of the electronic device 101 may identify a first distance, which is the distance between the electronic device 101 and the first external electronic device, and at least one second distance between the electronic device 101 and at least one second external electronic device. The operation of identifying the first distance described above in connection with operation 320 of FIG. 3 may be applied to operation 920 in the same or similar manner, and no repetitive description thereof is given below.

In operation 930, the processor 120 of the electronic device 101 may identify first state information about the first external electronic device and at least one piece of second state information about the at least one second external electronic device. The operation of identifying the first state information described above in connection with operation 330 of FIG. 3 may be applied to operation 930 in the same or similar manner, and no repetitive description thereof is given below.

In operation 940, the processor 120 of the electronic device 101 may identify the sleep time based on the first distance, at least one second distance, first state information, and at least one piece of second state information. Specifically, the processor 120 of the electronic device 101 may identify a first sleep time allowed by the first external electronic device based on the first distance and the first state information and at least one second sleep time allowed by the at least one second external electronic device based on the at least one second distance and the at least one piece of second state information, and identify that the shortest one of the first sleep time and the at least one second sleep time is the sleep time.

In operation 950, the processor 120 of the electronic device 101 may identify whether the sleep time needs to update. Specifically, when the sleep time identified in operation 940 is identical to the sleep time currently applied to the reception module of the first communication module, the processor 120 of the electronic device 101 may identify that the sleep time does not need to update and, when the sleep time identified in operation 940 differs from the sleep time currently applied to the reception module of the first communication module, identify that the sleep time needs to update. According to an embodiment, whenever updating the sleep time, the processor 120 of the electronic device 101 may store the updated sleep time in a memory (e.g., the memory 130) or the first communication module (e.g., the WI-FI communication module 230), identify that the latest sleep time stored in the memory 130 or the first communication module is the sleep time currently applied to the reception module of the first communication module, and compare the sleep time with the sleep time identified in operation 940.

Upon identifying that the sleep time does not need to update in operation 950, the processor 120 of the electronic device 101 may return to operation 920, repeating operations 920 to 950 until the sleep time is identified to need to update.

Upon identifying that the sleep time needs to update in operation 950, the processor 120 of the electronic device 101 may update the sleep time in operation 960. Specifically, the processor 120 of the electronic device 101 may control the reception module of the first communication module to remain in the sleep state during the sleep time identified in operation 940.

Although the operations 900 of FIG. 9 have been described in connection with an embodiment where an electronic device capable of creating a mobile hotspot is connected with a plurality of external electronic devices, it will be easily appreciated by one of ordinary skill in the art that operations similar to the operations 900 of FIG. 9 may be applied where the electronic device capable of creating a mobile hotspot is connected with a single external electronic device.

Figure 10A:
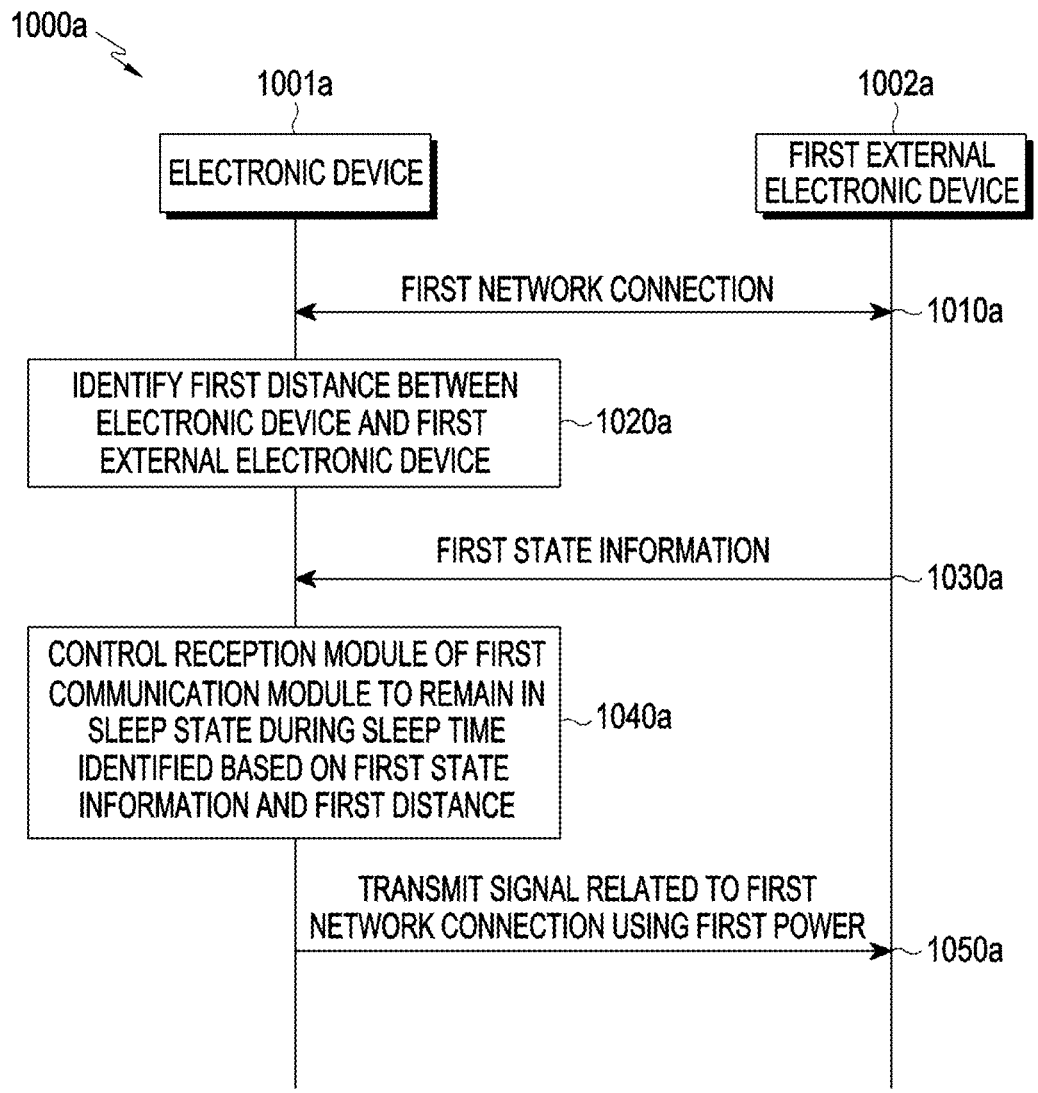
FIGS. 10A and 10B illustrate views of operations performed by an electronic device and a first external electronic device according to an embodiment.
Figure 10B:
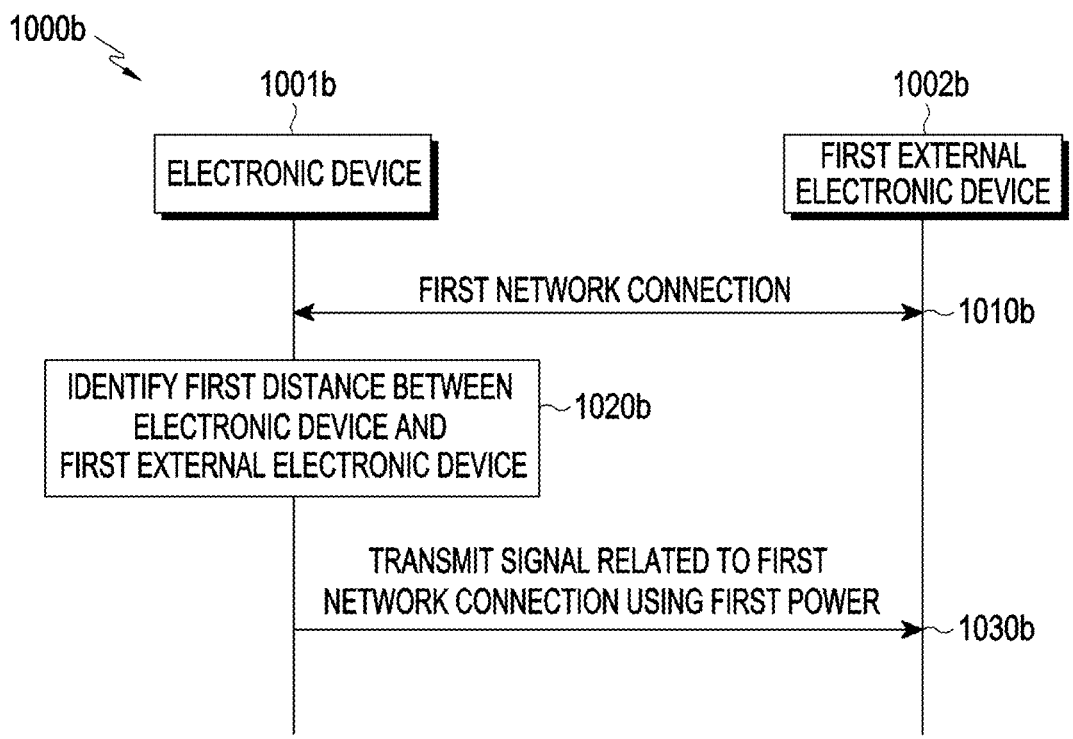

FIGS. 10A and 10B illustrate views of operations performed by an electronic device and a first external electronic device according to an embodiment. In the example environment 1000a of FIG. 10A, an electronic device 1001a (e.g., the electronic device 101) may be an electronic device capable of creating a mobile hotspot. According to an embodiment, a first external electronic device 1002a may be a client device for performing network communication in a hotspot created by the electronic device 1001a. The description of the electronic device 301 and first external electronic device 302 given above in connection with FIG. 3 may be applied likewise to the electronic device 1001*a* and first external electronic device 1002*a* of FIG. 10A and, thus, no duplicate description is presented below.

In operation 1010*a*, a processor (e.g., the processor 120) of the electronic device 1001*a* may establish a first communication network with the first external electronic device 1002*a* via a first communication module (e.g., the WI-FI communication module 230) of communication modules (e.g., the wireless communication module 200). Since the details described above in connection with operation 310 of FIG. 3 may apply likewise to operation 1010*a*, no repetitive description is given below.

In operation 1020*a*, the processor 120 of the electronic device 1001*a* may identify a first distance that is the distance between the electronic device 1001*a* and the first external electronic device 1002*a*. Since the details described above in connection with operation 320 of FIG. 3 may apply likewise to operation 1020*a*, no repetitive description is given below.

In operation 1030*a*, the processor 120 of the electronic device 1001*a* may receive first state information regarding the first external electronic device 1002*a* from the first external electronic device 1002*a*. Since the details described above in connection with operation 330 of FIG. 3 may apply likewise to operation 1030*a*, no repetitive description is given below.

In operation 1040*a*, the processor 120 of the electronic device 1001*a* may control the reception module of the WI-FI communication module 230 to remain in the sleep state during a sleep time identified based on the first state information and the first distance. Since the details described above in connection with operation 340 of FIG. 3 may apply likewise to operation 1040*a*, no repetitive description is given below.

In operation 1050*a*, the processor 120 of the electronic device 1001*a* may transmit a signal related to a first network connection through the WI-FI communication module 230 to the first external electronic device 1002*a* using first power. According to an embodiment, the first power may be identified based on the first distance, which is the distance between the electronic device 1001*a* and the first external electronic device 1002*a*. According to an embodiment, as the first distance increases, a larger first power may be identified.

According to an embodiment, after transmitting the signal related to the first network connection to the first external electronic device 1002*a* using the first power identified based on the first distance, the processor 120 of the electronic device 1001*a* may adjust the value of the first power based on the result of transmission of the signal and transmit the signal related to the first network connection to the first external electronic device 1002*a* using the adjusted first power. According to an embodiment, the result of transmission of the signal may include the success rate of packet transmission. According to an embodiment, the packet transmission success rate may be identified as the number of packets that have successfully been transmitted to the first external electronic device relative to the number of packets transmitted from the electronic device 1001*a*. For example, upon receiving an ack from the first external electronic device 1002*a* in response to a packet related to the first network connection transmitted from the electronic device 1001*a*, the processor 120 of the electronic device 1001*a* may identify that the transmission of the packet has succeeded.

According to an embodiment, after transmitting the signal related to the first network connection to the first external electronic device 1002*a* using the first power identified based on the first distance, the processor 120 of the electronic device 1001*a* may adjust the value of the first power based on a modulation coding scheme (MCS) rate required and may transmit the signal related to the first network connection to the first external electronic device 1002*a* using the adjusted first power. According to an embodiment, when the required MCS rate is higher, the processor 120 of the electronic device 1001*a* may adjust the first power to a higher value.

In the example environment 1000*b* of FIG. 10B, an electronic device 1001*b* (e.g., the electronic device 101) may be an electronic device capable of creating a mobile hotspot. According to an embodiment, a first external electronic device 1002*b* may be a client device for performing network communication in a hotspot created by the electronic device 1001*b*. The description of the electronic device 301 and first external electronic device 302 given above in connection with FIG. 3 may be applied likewise to the electronic device 1001*b* and first external electronic device 1002*b* of FIG. 10B and, thus, no duplicate description is presented below.

In operation 1010*b*, a processor (e.g., the processor 120) of the electronic device 1001*b* may establish a first communication network with the first external electronic device 1002*b* via a first communication module (e.g., the WI-FI communication module 230) of communication modules (e.g., the wireless communication module 200). Since the details described above in connection with operation 310 of FIG. 3 may apply likewise to operation 1010*b*, no repetitive description is given below.

In operation 1020*b*, the processor 120 of the electronic device 1001*b* may identify a first distance that is the distance between the electronic device 1001*b* and the first external electronic device 1002*b*. Since the details described above in connection with operation 320 of FIG. 3 may apply likewise to operation 1020*b*, no repetitive description is given below.

In operation 1030*b*, the processor 120 of the electronic device 1001*b* may transmit a signal related to a first network connection through the WI-FI communication module 230 to the first external electronic device 1002*b* using first power. Since the details described above in connection with operation 1050*a* of FIG. 10A may apply likewise to operation 1030*b*, no repetitive description is given below.

Figure 11A:
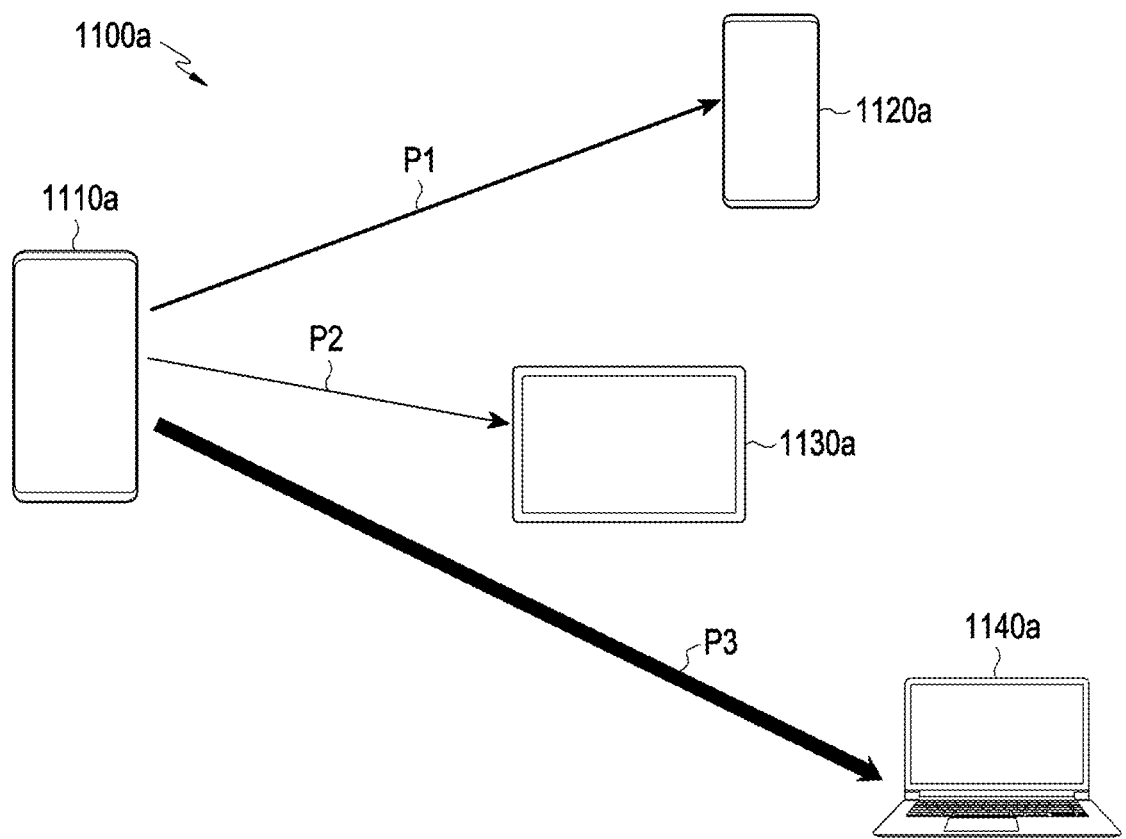
FIGS. 11A and 11B illustrate views of an electronic device connected with a plurality of external electronic devices according to an embodiment.
Figure 11B:
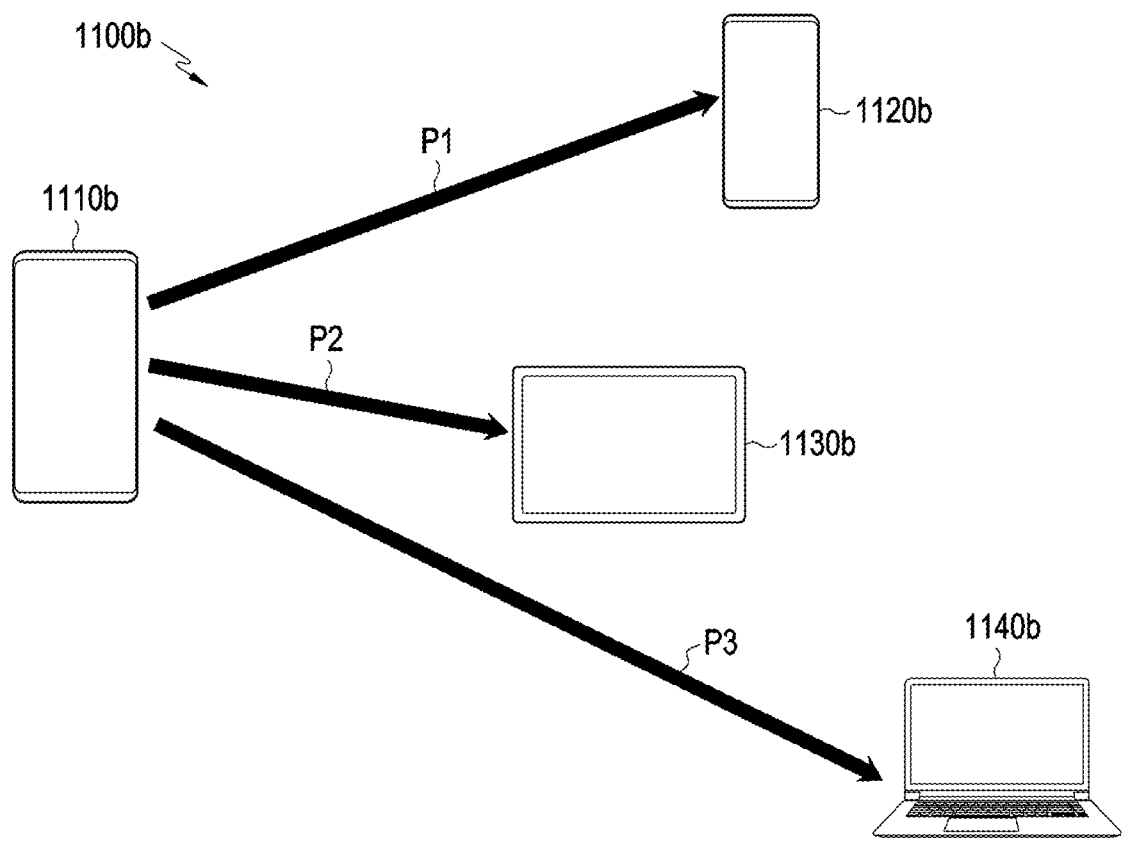

FIGS. 11A and 11B illustrate views of an electronic device connected with a plurality of external electronic devices according to an embodiment. Specifically, FIG. 11A illustrates an example of adjusting transmission power when an electronic device 1110*a* capable of creating a mobile hotspot may transmit signals to each of a plurality of client devices using a different transmission power. In the example environment 1100*a* of FIG. 11A, a first external electronic device 1120*a*, a second external electronic device 1130*a*, and a third external electronic device 1140*a* may be client devices for performing network communication in a hotspot created by the electronic device 1110*a*. The details of the electronic device 301 described above in connection with FIG. 3 may apply likewise to the electronic device 1110*a* of FIG. 11A, and the details of the first external electronic device 302 described above in connection with FIG. 3 may apply likewise to the first external electronic device 1120*a*, second external electronic device 1130*a*, and third external electronic device 1140*a* of FIG. 11A. Thus, no repetitive description is given below.

According to an embodiment, the electronic device 1110*a* may have the feature of setting a different transmission power to each of the first external electronic device 1120*a*, second external electronic device 1130*a*, and third external electronic device 1140*a*. In this case, the processor 120 of the electronic device 1110*a* may transmit a signal related to a first network connection, via the transmission module of the WI-FI communication module 230, to the first external electronic device 1120*a* using a power of P1, a signal related to the first network connection to the second external electronic device 1130*a* using a power of P2, and a signal related to the first network connection to the third external electronic device 1140*a* using a power of P3. In the example environment 1100*a* of FIG. 11A, among the first external electronic device 1120*a*, the second external electronic device 1130*a*, and the third external electronic device 1140*a*, the second external electronic device 1130*a* may be positioned closest to the electronic device 1110*a*, the first external electronic device 1120*a* may be positioned second closest to the electronic device 1110*a*, and the third external electronic device 1140*a* may be positioned farthest from the electronic device 1110*a*. According to an embodiment, the processor 120 of the electronic device 1110*a* may control the transmission module of the WI-FI communication module 230 so that among P1, P2, and P3, P2 is the highest, P1 the second highest, and P2 the lowest.

FIG. 11B illustrates an example of adjusting transmission power when an electronic device 1110*b* capable of creating a mobile hotspot may not transmit signals to each of a plurality of client devices using a different transmission power. In the example environment 1100*b* of FIG. 11B, the relationship in location of the electronic device 1110*b*, first external electronic device 1120*b*, second external electronic device 1130*b*, and third external electronic device 1140*b* and the details of each device may be identical to those of the electronic device 1110*a*, first external electronic device 1120*a*, second external electronic device 1130*a*, and third external electronic device 1140*a* of FIG. 11A except that the electronic device 1110*b* of FIG. 11B lacks the feature of being able to set a different transmission power to each of the plurality of client devices while the electronic device 1110*a* of FIG. 11A may set a different transmission power to each of the plurality of client devices.

The electronic device 1110*b* is unable to set a different transmission power to each of the first external electronic device 1120*b*, second external electronic device 1130*b*, and third external electronic device 1140*b*. Thus, in this case, the processor 120 of the electronic device 1110*b* may control the transmission module of the WI-FI communication module 230 to transmit signals related to the first network connection to all of the first external electronic device 1120*b*, second external electronic device 1130*b*, and third external electronic device 1140*b* using the same transmission power P3. According to an embodiment, the power value P3 may be identified based on the distance between the electronic device 1110*b* and, among the first external electronic device 1120*b*, second external electronic device 1130*b*, and third external electronic device 1140*b*, the third external electronic device 1140*b* which is positioned farthest from the electronic device 1110*b*. In other words, the power value P3 may be identified to be the largest power value among the power value identified based on the distance between the first external electronic device 1120*b* and the electronic device 1110*b*, the power value identified based on the distance between the second external electronic device 1130*b* and the electronic device 1110*b*, and the power value identified based on the distance between the third external electronic device 1140*b* and the electronic device 1110*b*.

Although an example in which three client devices are used is described in connection with FIGS. 11A and 11B, it will be easily appreciated by one of ordinary skill in the art that the adjustment of transmission power described above in connection with FIGS. 11A and 11B may be performed in a similar manner even when any other number of client devices are used.

Figure 12:
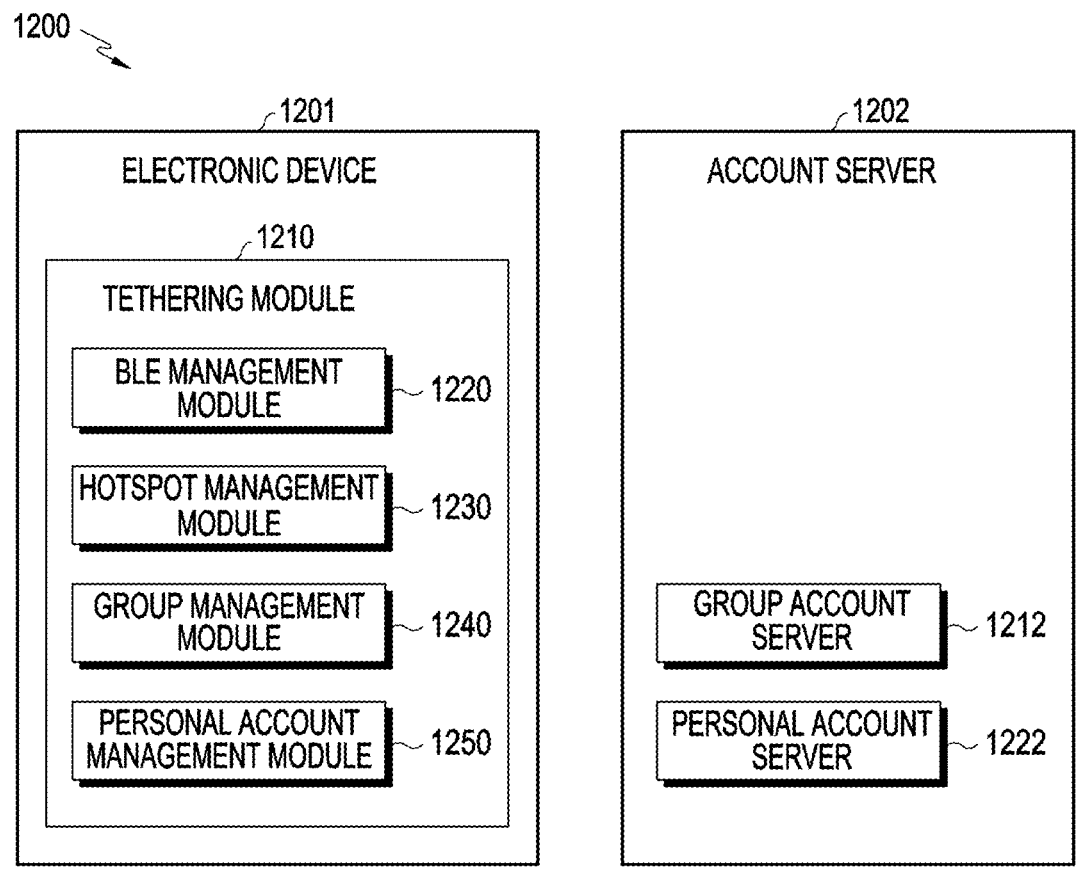
FIG. 12 illustrates a view of an electronic device and an account server according to an embodiment.

FIG. 12 illustrates a view of an electronic device and an account server according to an embodiment. In the example environment 1200 of FIG. 12, an electronic device 1201 and an account server 1202 may be included. According to an embodiment, the electronic device 1201 may be a mobile hotspot device capable of creating a mobile hotspot or a client device capable of performing network communication in a hotspot created by other electronic device.

According to an embodiment, the electronic device 1201 may include a tethering module 1210. The tethering module 1210 may include a BLE management module 1220, a hotspot management module 1230, a group management module 1240, and a personal account management module 1250. According to an embodiment, the BLE management module 1220 may be used to provide a BLE service. According to an embodiment, the hotspot management module 1230 may be used to manage the hotspot and WI-FI. According to an embodiment, the group management module 1240 may be used to manage the group account related to the electronic device 1201. According to an embodiment, the group account may be a family account or an account of a group other than the family. According to an embodiment, the group management module 1240 may manage information about a list of one or more groups where the user of the electronic device 1201 belongs and personal account about a list of members belonging to each group and the members. According to an embodiment, when the list of one or more groups where the user of the electronic device 1201 belongs and/or the list of the members belonging to each group is updated, the group management module 1240 may transmit the updated information to the group account server 1212 of the account server 1202.

According to an embodiment, the personal account management module 1250 may be used to manage the personal account related to the user of the electronic device 1201. According to an embodiment, when the user of the electronic device 1201 creates a new personal account regarding the electronic device 1201, the personal account management module 1250 may transmit information regarding the personal account and/or identification information about the electronic device 1201 to the personal account server 1222 of the account server 1202.

According to an embodiment, the account server 1202 may include the group account server 1212 and the personal account server 1222. The account server 1202 may comprehensively manage personal accounts and group account related to a plurality of electronic devices. According to an embodiment, the group account server 1212 of the account server 1202 may include at least one of a list of a plurality of groups, a list of personal accounts related to the members belonging to each group, or identification information about the electronic device corresponding to the personal account related to the members belonging to each group. According to an embodiment, the personal account server 1222 of the account server 1202 may include at least one of the list of personal accounts or the list of pieces of identification information about the electronic device corresponding to the personal account.

Figure 13:
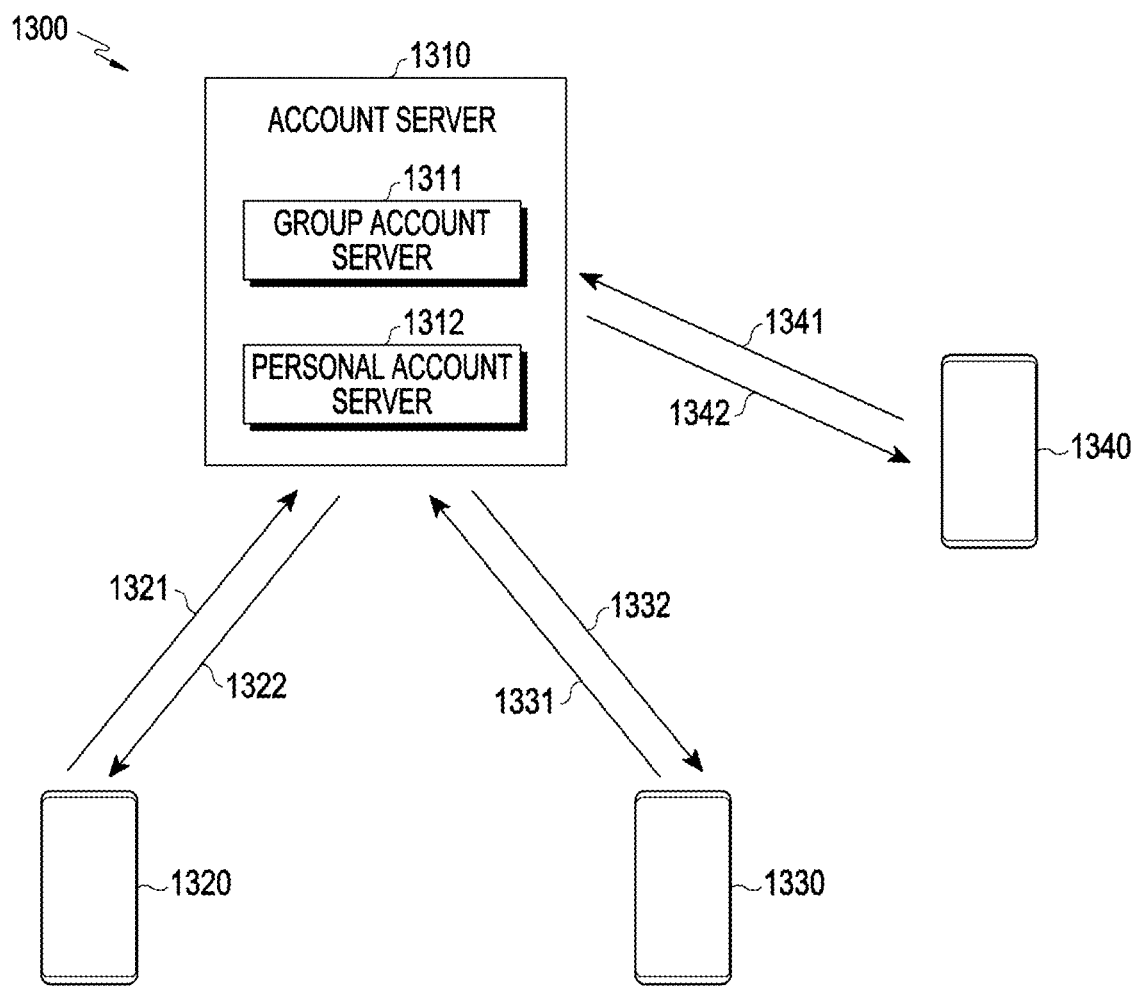
FIG. 13 illustrates a view of an account server connected with a plurality of electronic devices according to an embodiment.

FIG. 13 illustrates a view of an account server connected with a plurality of electronic devices according to an embodiment. In the example environment 1300 of FIG. 13, an account server 1310, a first electronic device 1320, a second electronic device 1330, and a third electronic device 1340 may be included. According to an embodiment, the account server 1310 may include the group account server 1311 and the personal account server 1312. The details of the account server 1202, group account server 1212, and personal account server 1222 described above in connection with FIG. 12 may be applied likewise to the account server 1310, group account server 1311, and personal account server 1312. According to an embodiment, the first electronic device 1320, second electronic device 1330, and third electronic device 1340 may be electronic devices capable of creating a mobile hotspot or client devices for performing network communication in a hotspot created by the electronic device.

According to an embodiment, upon boot-up or based on a request from the user of the first electronic device 1320, the first electronic device 1320 may transmit an account information request 1321 to the account server 1310. According to an embodiment, the account information request 1321 may include identification information about the first electronic device 1320. According to an embodiment, upon receiving the account information request 1321 from the first electronic device 1320, the account server 1310 may transmit account information 1322 to the first electronic device 1320.

According to an embodiment, the account information may include at least one of the list of the group account related to the first electronic device 1320 included in the group account server 1311, the list of personal accounts related to the member belonging to each group related to the first electronic device 1320, or identification information about the electronic device corresponding to the personal account related to the member belonging to each group. According to an embodiment, the account information may include information regarding the personal account related to the first electronic device 1320. According to an embodiment, the second electronic device 1330 and the third electronic device 1340 may also transmit account information requests 1331, 1341 to the account server 1310 upon boot-up or at a request from the user, as does the first electronic device 1320 and, in response, receive each piece of account information 1332, 1342 from the account server 1310.

Figure 14:
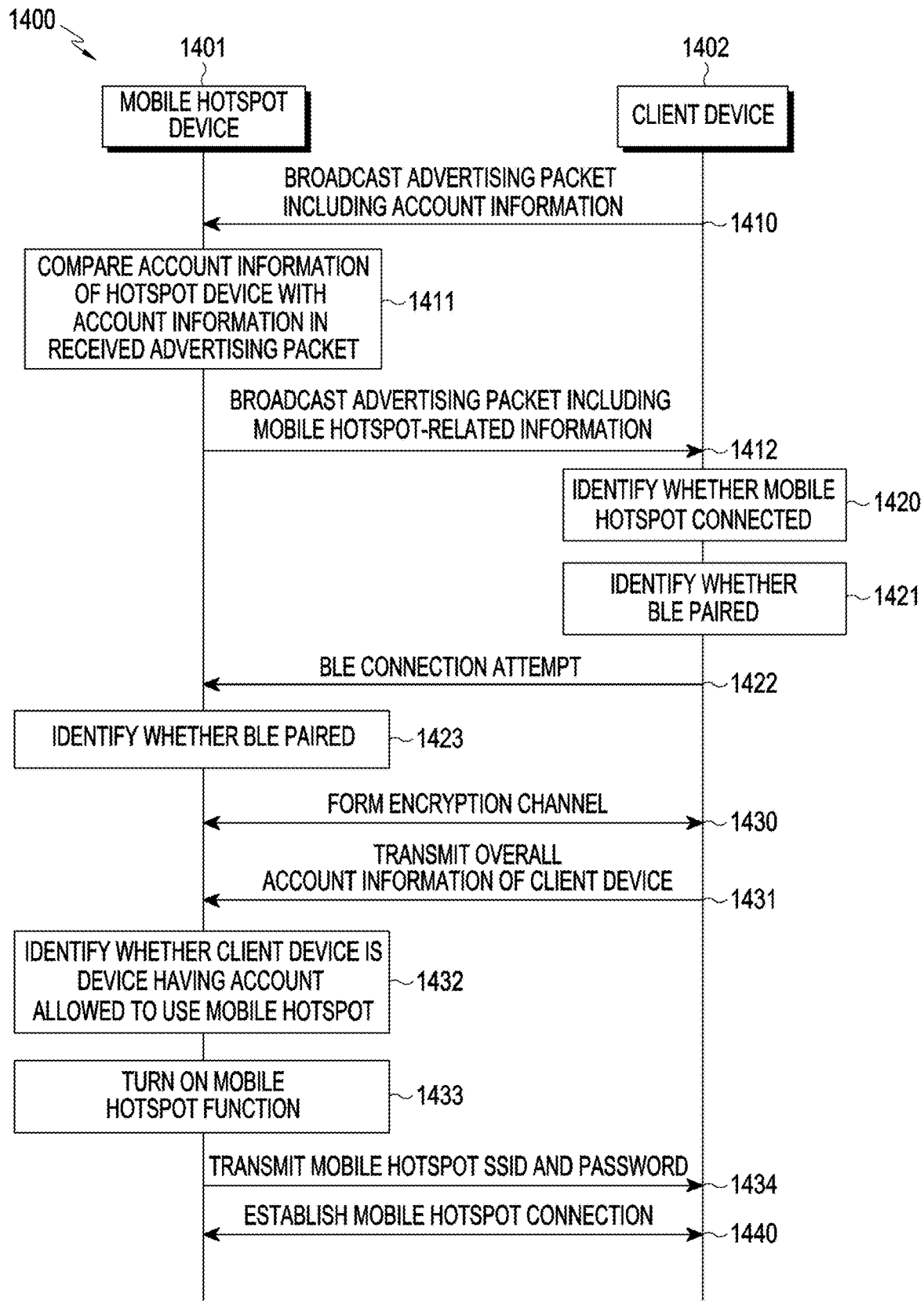
FIG. 14 illustrates a view of operations performed by a hotspot terminal and a client device according to an embodiment.

FIG. 14 illustrates a view of operations performed by a hotspot terminal and a client device according to an embodiment. Specifically, the operations 1400 of FIG. 14 are operations for establishing a mobile hotspot connection without requesting the user's input by authenticating account information using BLE, as performed by a client device 1402 or mobile hotspot device 1401 that has received account information from an account server as described above in connection with FIG. 13.

In operation 1410, the client device 1402 may broadcast advertising packets including account information about the client device 1402. According to an embodiment, the advertising packet may include a hotspot connection request in addition to the account information. According to an embodiment, the account information about the client device 1402 may be account information that the client device 1402 has received from an account server (e.g., the account server 1310 of FIG. 13). According to an embodiment, the account information about the client device 1402 may include a personal account associated with the client device 1402 and information indicating the account of the group where the client device 1402 belongs. According to an embodiment, the advertising packet may include a hash value of the account information about the client device 1402.

In operation 1411, the mobile hotspot device 1401 may receive the advertising packet broadcast from the client device 1402 and compare the account information included in the received advertising packet with the account information about the mobile hotspot device 1401. According to an embodiment, the account information about the mobile hotspot device 1401 may be account information that the mobile hotspot device 1401 has received from the account server. According to an embodiment, the account information about the mobile hotspot device 1401 may include the personal account associated with the mobile hotspot device 1401 and information indicating the account of the group where the mobile hotspot device 1401 belongs. According to an embodiment, the mobile hotspot device 1401 may identify whether the personal account associated with the client device 1402 matches the personal account associated with the mobile hotspot device 1401. According to an embodiment, the mobile hotspot device 1401 may identify whether the accounts of one or more groups where the client device 1402 belongs include the same group account as the account of the group where the mobile hotspot device 1401 belongs.

In operation 1411, upon identifying that the personal account associated with the client device 1402 matches the personal account associated with the mobile hotspot device 1401 or that the accounts of one or more groups where the client device 1402 belongs include the same group account as the account of the group where the mobile hotspot device 1401 belongs, the mobile hotspot device 1401 may perform operation 1412. In operation 1412, the mobile hotspot device 1401 may broadcast advertising packets including mobile hotspot-related information about the mobile hotspot device 1401. According to an embodiment, the mobile hotspot-related information about the mobile hotspot device 1401 may include at least one of the remaining battery percentage of the mobile hotspot device 1401, the kind of network connected with the mobile hotspot device 1401, signal strength of network connected with the mobile hotspot device 1401, or the capacity of data transmission/reception that may be provided.

In operation 1412, upon receiving the broadcast advertising packet including the mobile hotspot-related information about the mobile hotspot device 1401, the client device 1402 may perform operation 1420. In operation 1420, the client device 1402 may identify whether to connect to the mobile hotspot of the mobile hotspot device 1401 based on the mobile hotspot-related information about the mobile hotspot device 1401 included in the advertising packet of the mobile hotspot device 1401. According to an embodiment, the client device 1402 may output at least part of the mobile hotspot-related information about the mobile hotspot device 1401 via a display (e.g., the display device 160) or sound output device 155, prompt the user for whether to connect to the mobile hotspot of the mobile hotspot device 1401, and identify whether to connect to the mobile hotspot of the mobile hotspot device 1401 according to the user's input in response to the prompt.

According to an embodiment, the client device 1402 may perform operations 1420 to 1412 with one or more other hotspot devices, as well as the mobile hotspot device 1401, thereby outputting mobile hotspot-related information about the one or more other hotspot devices, along with the mobile hotspot-related information about the mobile hotspot device 1401, via the display device 160 or sound output device 155, and the client device 1402 may prompt the user for which one's mobile hotspot among the mobile hotspot device 1401 and the one or more other hotspot devices the user is to connect to, and identify whether to connect to the mobile hotspot of the mobile hotspot device 1401 according to the user's input responsive to the prompt. According to an embodiment, when able to connect to an access point, the client device 1402 may output access point-related information, along with the mobile hotspot-related information about the mobile hotspot device 1401, via the display device 160 or sound output device 155, prompt the user for whether the user is to connect to the access point or the mobile hotspot of the mobile hotspot device 1401, and identify whether to connect to the mobile hotspot of the mobile hotspot device 1401 according to the user's input responsive to the prompt.

According to an embodiment, in operation 1420, the identification of whether to connect to the mobile hotspot of the mobile hotspot device 1401 may be performed without the client device 1402 prompting the user. According to an embodiment, the client device 1402 may identify whether to connect to the mobile hotspot of the mobile hotspot device 1401 based on a predetermined condition. According to an embodiment, the predetermined condition may include at least one of when the signal strength of network connected to the mobile hotspot device 1401 is a predetermined level or more or when the capacity of data transmission/reception that may be provided is a predetermined level or more.

According to an embodiment, the client device 1402 may connect to a mobile hotspot provided by one hotspot device depending on preset priorities among one or more hotspot devices including an access point and the mobile hotspot device. According to an embodiment, the preset priorities may be set based on at least one of the signal strength of network connected to the hotspot device, the capacity of data transmission/reception that may be allowed by the hotspot device, data speed provided, the remaining battery percentage of the mobile hotspot device, or the number of client devices currently connected to the hotspot device. According to an embodiment, the preset priorities may be set to prioritize the access point over the mobile hotspot device.

When it is identified to connect to the mobile hotspot of the mobile hotspot device 1401 in operation 1420, the client device 1402 may identify whether to create a BLE pairing with the mobile hotspot device 1401 in operation 1421. According to an embodiment, the client device 1402 may prompt the user of the client device 1402 for whether to create a BLE pairing with the mobile hotspot device 1401 and may identify whether to create a BLE pairing with the mobile hotspot device 1401 according to an input from the user of the client device 1402 responsive to the prompt. According to an embodiment, operation 1421 may be performed only once when the client device 1402 forms a BLE pairing with the mobile hotspot device 1401. In this case, subsequent operations 1422 and 1423 may also be performed only once when a BLE pairing is created between the client device 1402 and the mobile hotspot device 1401.

Upon identifying that the client device 1402 is to create a BLE pairing with the mobile hotspot device 1401 in operation 1421, the client device 1402 may transmit a signal to attempt a BLE connection to the mobile hotspot device 1401 in operation 1422.

In operation 1422, upon receiving the signal to attempt a BLE connection from the client device 1402, the mobile hotspot device 1401 may identify whether to create a BLE pairing with the client device 1402 in operation 1423. According to an embodiment, the mobile hotspot device 1401 may prompt the user of the mobile hotspot device 1401 for whether to create a BLE pairing with the client device 1402 and identify whether to create a BLE pairing with the client device 1402 according to an input from the user of the mobile hotspot device 1401 responsive to the prompt.

In operation 1423, upon identifying that the mobile hotspot device 1401 is to create a BLE pairing with the client device 1402, the mobile hotspot device 1401 may create a BLE pairing with the client device 1402, thereby forming an encryption channel. Although operations 1421 to 1430 have been described with BLE pairing taken as an example, any method for forming an encryption channel between the mobile hotspot device 1401 and the client device 1402 may be used according to an embodiment. For example, in operations 1421 to 1423, the mobile hotspot device 1401 and the client device 1402 may receive the same encryption key from separate account servers and use the same.

In operation 1431, the client device 1402 may transmit the whole account information related to the client device 1402 to the mobile hotspot device 1401 via the encryption channel.

Upon receiving the whole account information related to the client device 1402, the mobile hotspot device 1401 may identify whether the client device 1402 is a device with an account by which hotspot connection is allowed in operation 1432. According to an embodiment, the mobile hotspot device 1401 may identify that the client device 1402 is a device associated with the same personal account as the mobile hotspot device 1401 based on the personal account of the client device 1402 and, based thereupon, identify that the client device 1402 is a device allowing hotspot connection. According to an embodiment, the mobile hotspot device 1401 may identify that the client device 1402 is a device belonging to the same group account as the mobile hotspot device 1401 based on the group account of the client device 1402 and, based thereupon, identify that the client device 1402 is a device allowing hotspot connection.

According to an embodiment, the mobile hotspot device 1401 may belong to one or more group accounts and may previously make a setting as to whether to allow hotspot connection for the whole group for each group where the mobile hotspot device 1401 belongs. In this case, although the mobile hotspot device 1401 identifies that the client device 1402 is a device belonging to the same group account as the mobile hotspot device 1401 based on the group account of the client device 1402, if such a setting that hotspot connection is not allowed for the group account where the client device 1402 and the mobile hotspot device 1401 jointly belong has been made in the mobile hotspot device 1401, the mobile hotspot device 1401 may identify that the client device 1402 is not a device with the account allowed for use of the mobile hotspot.

According to an embodiment, the mobile hotspot device 1401 may belong to one or more group accounts, and the mobile hotspot device 1401 may previously make a setting as to whether to allow hotspot connection for each member in the group where the mobile hotspot device 1401 belongs. In this case, although the mobile hotspot device 1401 identifies that the client device 1402 is a device belonging to the same group account as the mobile hotspot device 1401 based on the group account of the client device 1402, if the member corresponding to the client device 1402 is set as one not allowed for hotspot connection, the mobile hotspot device 1401 may identify that the client device 1402 is not a device with an account allowed to use the mobile hotspot.

In operation 1432, upon identifying that the client device 1402 is a device with the account allowed to use the mobile hotspot, the mobile hotspot device 1401 may turn on its mobile hotspot function in operation 1433.

Thereafter, the mobile hotspot device 1401 may transmit a mobile hotspot service set identifier (SSID) and password for connecting to the mobile hotspot to the client device 1402 in operation 1434. According to an embodiment, operation 1434 may be performed via the encryption channel described above in connection with operation 1430.

In operation 1440, the client device 1402 may connect to the mobile hotspot provided by the mobile hotspot device 1401 using the mobile hotspot SSID and password received from the mobile hotspot device 1401.

Figure 15:
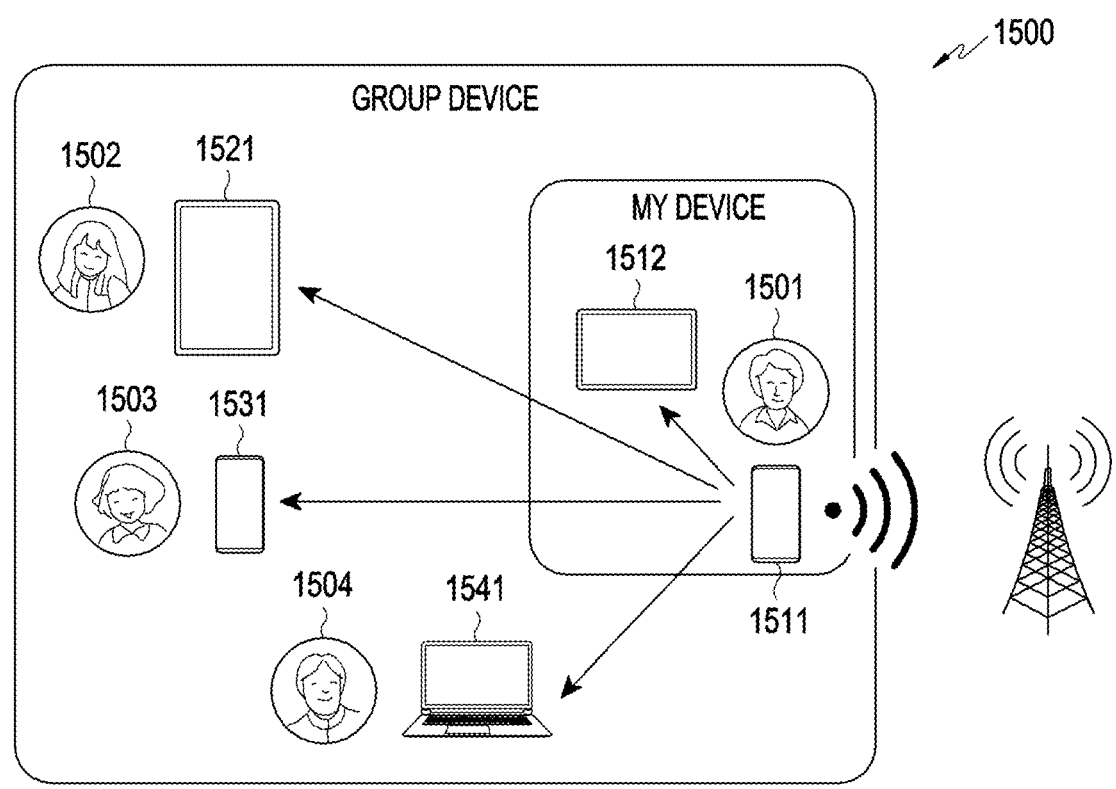
FIG. 15 illustrates a view of some kinds of devices according to an embodiment.

FIG. 15 illustrates a view of some kinds of devices according to an embodiment. In the example environment 1500 of FIG. 15, user device 1 1511 and user device 2 1512 owned by a user 1501 may be included in the category of 'my device' from the user 1501's standpoint. According to an embodiment, group member device 1 1521 owned by group member 1 1502 belonging to the same group as the user 1501, group member device 2 1531 owned by group member 2 1503, and group member device 3 1541 owned by group member 3 1504 may be included in the category of 'group device.' Assuming that user device 1 1511 of the user 1501 operates as a hotspot device, the user 1501 may support mobile hotspot connection for group member device 1 1521 owned by group member 1 1502 belonging to the same group as the user 1501, group member device 2 1531 owned by group member 2 1503, and group member device 3 1541 owned by group member 3 1504, as well as mobile hotspot connection for user device 2 1512 which is the user 1501's own device.

Figure 16A:
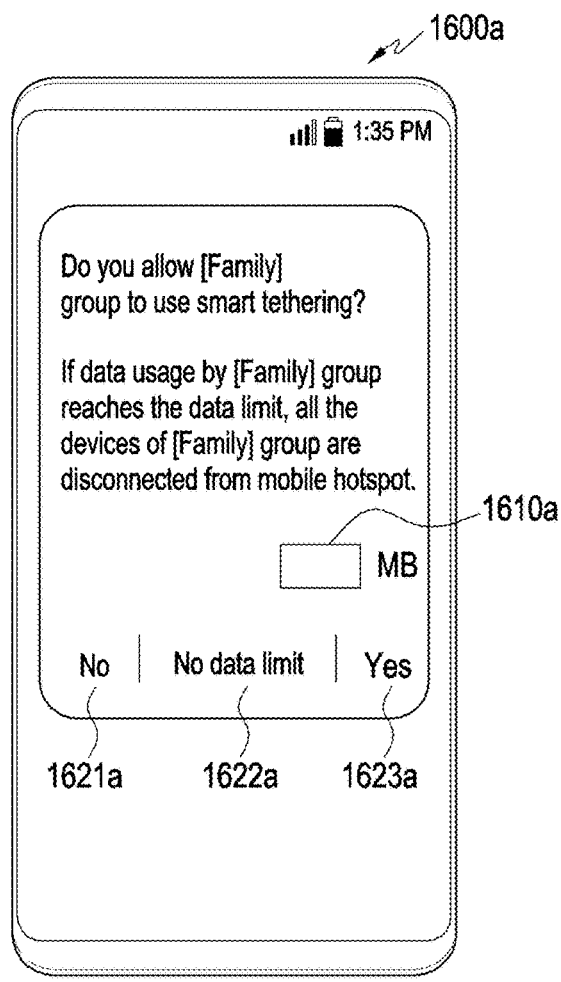
FIGS. 16A and 16B illustrate views of a screen displayed on a hotspot terminal according to an embodiment.
Figure 16B:
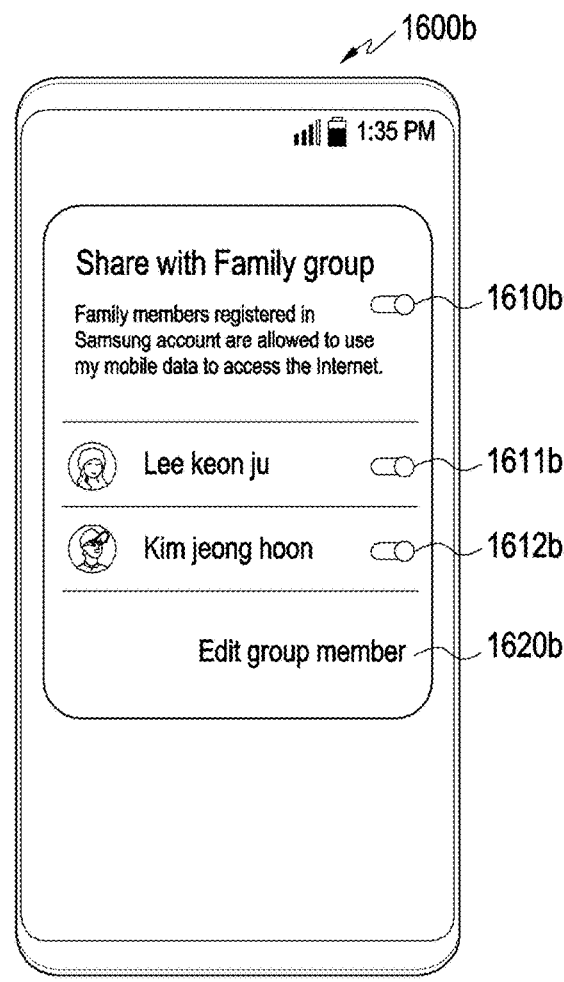

FIGS. 16A and 16B illustrate views of a screen displayed on a hotspot terminal according to an embodiment. A message inquiring whether to allow a 'Family' group hotspot connection may be displayed on a prompt screen 1600a of FIG. 16A. According to an embodiment, when the 'Family' group is allowed hotspot connection, the prompt screen 1600a may include a textbox 1610a for entry of an upper limit on allowed data usage. According to an embodiment, there may be included a graphic element 1621a corresponding to a choice for disallowing the 'Family' group's mobile hotspot connection, a graphic element 1622a corresponding to a choice for allowing the 'Family' group mobile hotspot connection without an upper limit on data usage, and a graphic element 1623a corresponding to a choice for allowing the 'Family' group mobile hotspot connection with an upper limit on data usage. According to an embodiment, when no corresponding entry is made to the textbox 1610a, the graphic element 1623a corresponding to the choice for allowing the group mobile hotspot connection with an upper limit on data usage may be inactive.

On the group management screen 1600b shown in FIG. 16B, the user of the hotspot terminal may view information related to the 'Family' group and change the settings related to the 'Family' group. According to an embodiment, the group management screen 1600b may include a graphic element 1610b indicating whether to allow all of the group members mobile hotspot connection. According to an embodiment, the group management screen 1600b may include graphic elements 1611b and 1612b indicating whether to allow each group member mobile hotspot connection. According to an embodiment, the group management screen 1600b may include a graphic element 1620b for linking to a group member edit function for adding a new group member or deleting an existing group member.

Figure 17:
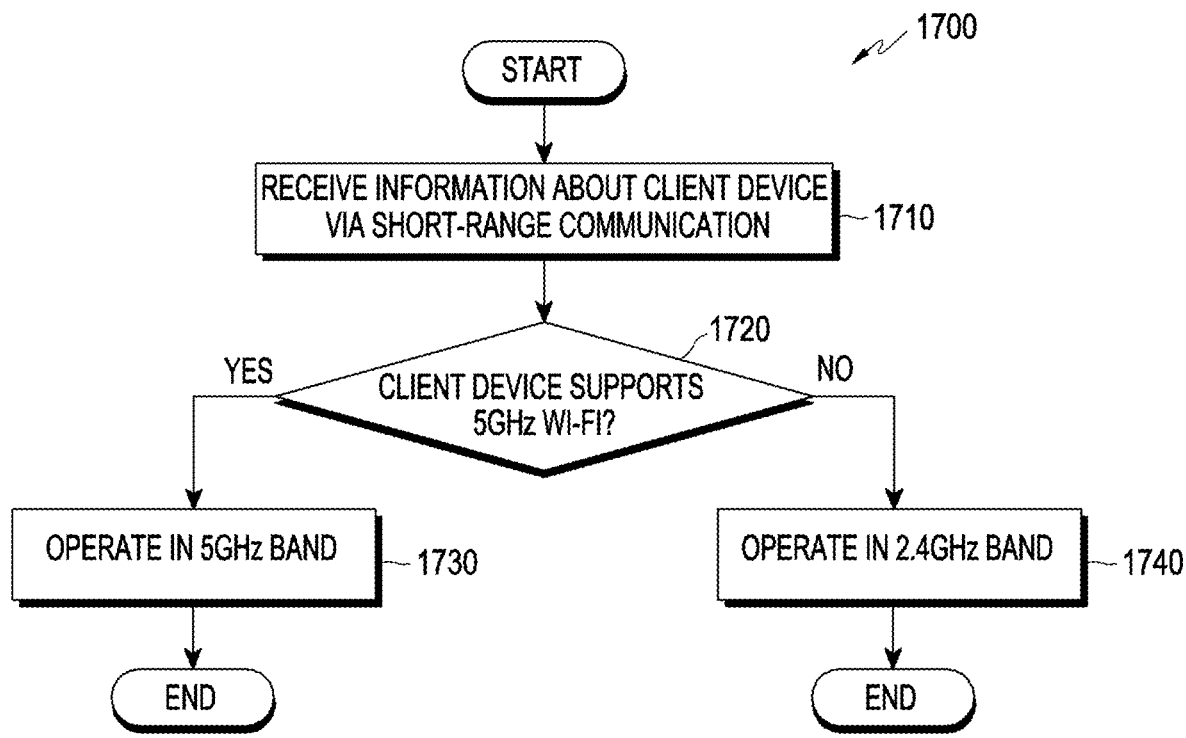
FIG. 17 illustrates a flowchart of operations of a hotspot terminal according to an embodiment.

FIG. 17 illustrates a flowchart of operations of a hotspot terminal according to an embodiment. The operations 1700 of FIG. 17 are operations performed by a processor (e.g., the processor 120) of a hotspot device (e.g., the electronic device 101) to determine which frequency band the hotspot device is to operate in when the hotspot device selectively supports operations in a 2.4 GHz frequency band and operations in a 5 GHz frequency band.

In operation 1710, the processor 120 of the hotspot device may receive information about a client device via a communication module (e.g., the OOB communication module 240) and short-range communication. According to an embodiment, the short-range communication may be performed via the encryption channel described above in connection with FIG. 14. According to an embodiment, the client device information may indicate whether the client device supports WI-FI communication using the 5 GHz frequency band.

In operation 1720, the processor 120 of the hotspot device may identify whether the client device supports WI-FI communication using the 5 GHz frequency band based on the client device information received via short-range communication.

In operation 1720, upon identifying that the client device supports WI-FI communication using the 5 GHz frequency band, the processor 120 of the hotspot device may control a module (e.g., the WI-FI communication module 230) related to the mobile hotspot, among the communication modules, to operate in the 5 GHz band in operation 1730.

In operation 1720, upon identifying that the client device does not support WI-FI communication using the 5 GHz frequency band, the processor 120 of the hotspot device may control a module (e.g., the WI-FI communication module 230) related to the mobile hotspot, among the communication modules, to operate in the 2.4 GHz band in operation 1740.

Figure 18A:
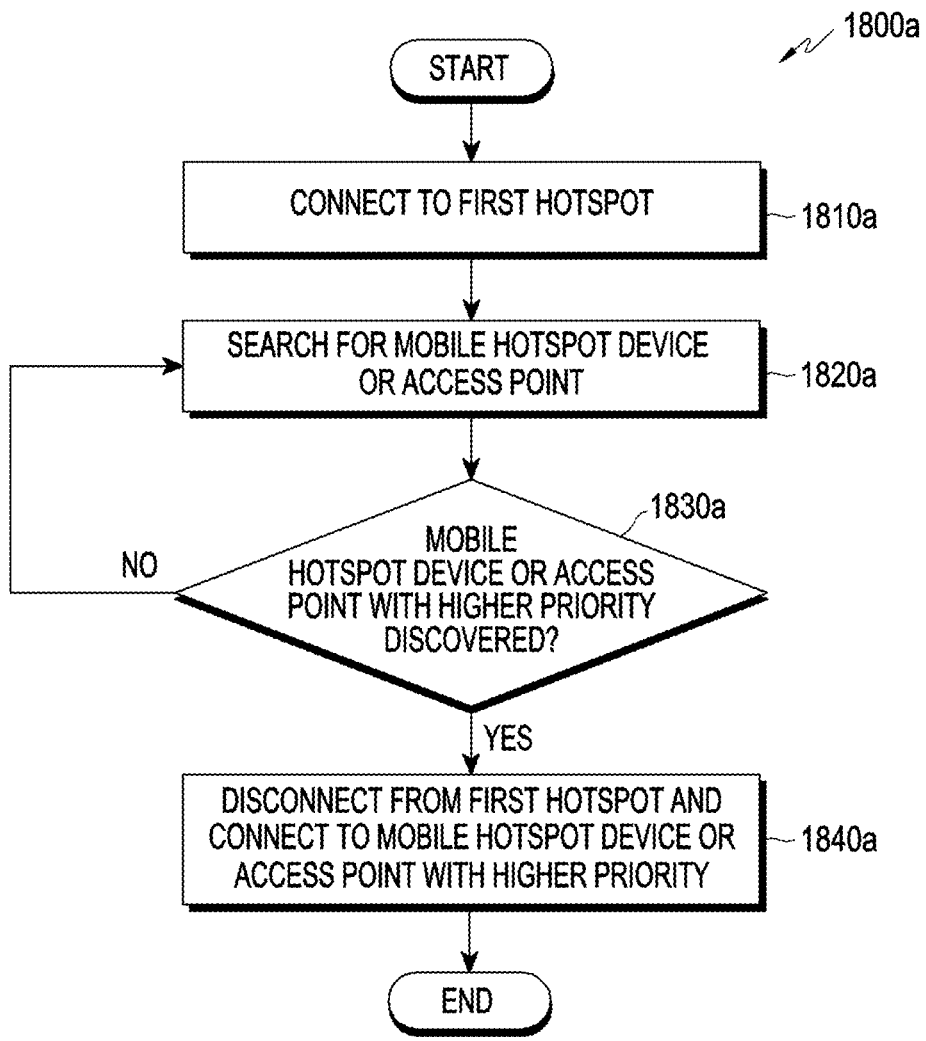
FIGS. 18A and 18B illustrate flowcharts of operations of a client device according to an embodiment.
Figure 18B:
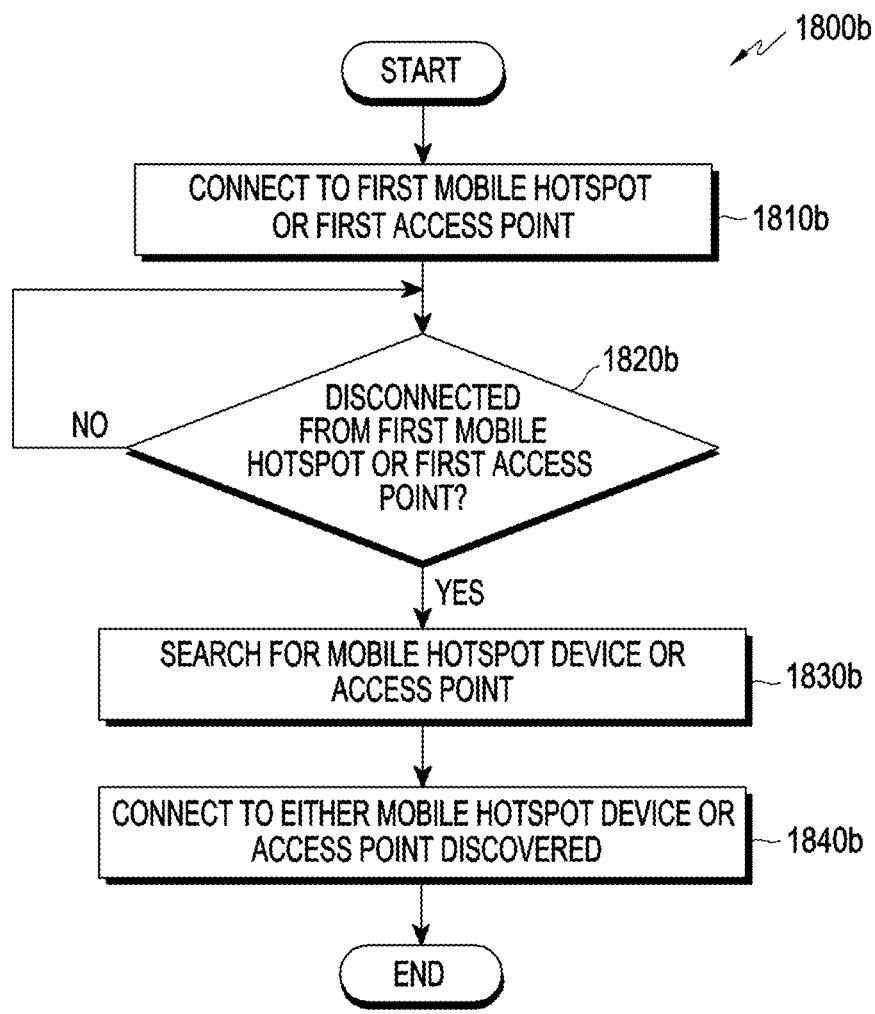

FIGS. 18A and 18B illustrate flowcharts of operations of a client device according to an embodiment. The operations 1800a of FIG. 18A are operations performed by a client device when there are a plurality of hotspot devices capable of providing a hotspot to the client device.

In operation 1810a, the client device may connect to a first hotspot. According to an embodiment, the first hotspot may be a hotspot provided by an access point or a mobile hotspot. A detailed process for connecting to the mobile hotspot has been described above in connection with FIG. 14 and, thus, no repetitive description thereof is given below.

In operation 1820a, the client device may search for a mobile hotspot device or access point, with it connected to the first hotspot.

In operation 1830a, the client device may identify whether a device with a higher priority than the hotspot device related to the first hotspot currently connected to the client device is among the mobile hotspot devices or access points discovered. According to an embodiment, the priorities may be preset by the client device. According to an embodiment, the priorities may be set based on at least one of the signal strength of network connected to the hotspot device, the capacity of data transmission/reception that may be allowed by the hotspot device, data speed provided, the remaining battery percentage of the mobile hotspot device, or the number of client devices currently connected to the hotspot device. According to an embodiment, the access point may have a higher priority than the mobile hotspot device. According to an embodiment, the number of client devices currently connected to the hotspot device may be identified by detecting the channel signal. According to an embodiment, the priorities may be set to prioritize my device over the group device. According to an embodiment, a different priority may be set per group member.

Upon identifying that no mobile hotspot device or access point is discovered with a higher priority than the hotspot device related to the first hotspot currently connected in operation 1830a, the client device may repeat operations 1820a and 1830a until it is identified that a mobile hotspot device or access point with a higher priority than the hotspot device related to the first hotspot currently connected is discovered. For example, the client device may periodically identify whether a mobile hotspot device or access point with a higher priority than the hotspot device related to the first hotspot currently connected is discovered.

In operation 1830a, upon identifying that at least any one of mobile hotspot devices or access points discovered in operation 1830a has a higher priority than the hotspot device related to the first hotspot currently connected, the client device may be disconnected from the first hotspot and connect to the mobile hotspot device or access point with the highest priority among the mobile hotspot devices or access points discovered in operation 1840a.

The operations 1800b of FIG. 18B are operations performed by a client device. In operation 1810b, the client device may connect to a first mobile hotspot or a first access point. In operation 1820b, the client device may identify whether it is disconnected from the first mobile hotspot or first access point. According to an embodiment, the client device may identify whether it is disconnected from the first mobile hotspot or first access point based on at least one of a predetermined number of, or more, failures in transmission to the first mobile hotspot or first access point or the strength of a signal received from the first mobile hotspot or first access point.

In operation 1820b, upon identifying that the client device is not disconnected from the first mobile hotspot or first access point, the client device may repeat operation 1820b until the client device is identified to be disconnected from the first mobile hotspot or first access point.

In operation 1820b, upon identifying that the client device is disconnected from the first mobile hotspot or first access point, the client device may search for a mobile hotspot device or access point to which a new connection is to be established in operation 1830b.

In operation 1840b, the client device may connect to one of mobile hotspot devices or access points discovered. A process for connection to the mobile hotspot device has been described above in connection with FIG. 14, and no repetitive description thereof is given.

According to an embodiment, an electronic device 101 may comprise a communication module 190 and at least one processor 120. The at least one processor 120 may be configured to establish a first network connection with a first external electronic device via a first communication module 230 of the communication module 190, identify a first distance between the electronic device 101 and the first external electronic device, identify first state information about the first external electronic device, and control a reception module of the first communication module 230 to remain in a sleep state during a sleep time identified based on the first state information and the first distance.

According to an embodiment, the at least one processor 120 may be configured to control the reception module of the first communication module 230 to be in a wake up state during a wakeup time which is a remaining time in a designated period except for the sleep time.

According to an embodiment, the at least one processor 120 may be configured to identify, as at least part of the first state information, the amount of data transmitted/received between the electronic device and the first external electronic device via the first network connection.

According to an embodiment, the at least one processor 120 may be configured to identify the first distance using a communication signal received via at least part of the communication module 190.

According to an embodiment, the first state information may include at least one of information indicating whether the first external electronic device is in the sleep state, movement information about the first external electronic device, information indicating the kind of an application running on the first external electronic device, or information indicating whether a user wearing the first external electronic device is asleep.

According to an embodiment, the at least one processor 120 may be configured to, when the first distance is less than a threshold distance, control a second communication module 240 included in the communication module 190 to receive the first state information from the first external electronic device via a second network connection and, when the first distance is equal to or greater than the threshold distance, control the first communication module 230 to receive the first state information from the first external electronic device via the first network connection.

According to an embodiment, the threshold distance may correspond to a coverage range for the second network connection.

According to an embodiment, when the first distance between the electronic device and the first external electronic device is equal to or greater than the threshold distance, the sleep time may be equal to or less than a first time and, when the first distance between the electronic device and the first external electronic device is less than the threshold time, the sleep time may be equal to or less than a second time. The first time may be shorter than the second time.

According to an embodiment, the at least one processor 120 may be configured to establish the first network connection with at least one second external electronic device via the communication module 190, identify at least one second distance between the electronic device and the at least one second external electronic device, identify at least one piece of second state information about the at least one second external electronic device, and identify the sleep time as a shortest one of a first sleep time identified by the first state information and the first distance and at least one second sleep time identified by the at least one piece of second state information and the at least one second distance.

According to an embodiment, the at least one processor 120 may be configured to control the first communication module 230 to transmit a signal related to the first network connection to the first external electronic device using a first power identified based on the first distance.

According to an embodiment, the at least one processor 120 may be configured to establish the first network connection with at least one second external electronic device via the communication module 190, identify at least one second distance between the electronic device and the at least one second external electronic device, and control the first communication module 230 to transmit a signal related to the first network connection to the first external electronic device and the at least one second external electronic device using a third power. The third power may be identified as a highest value of among the first power and at least one second power identified based on the at least one second distance.

According to an embodiment, the at least one processor 120 may be configured to establish the first network connection with at least one second external electronic device via the communication module 190, identify at least one second distance between the electronic device and the at least one second external electronic device, and control the first communication module 230 to transmit a signal related to the first network connection to each of the at least one second external electronic device using at least one second power identified based on the at least one second distance.

According to an embodiment, an electronic device 101 comprises a wireless-fidelity (WI-FI) communication module 230 configured to support a first network communication, a BLUETOOTH low energy (BLE) communication module 240 configured to support a second network communication, and at least one processor 120 configured to activate the WI-FI communication module 230 based on activation of a mobile hotspot function, establish a first network connection with a first external electronic device via the WI-FI communication module 230, measure a distance between the electronic device and the first external electronic device, when the distance is equal to or less than a designated distance, control the BLE communication module 240 to receive state information about the first external electronic device using the second network communication and control a reception module of the WI-FI communication module 230 to have a sleep time of a first time based on the state information, and when the distance is less than the designated distance, control the WI-FI communication module 230 to receive the state information about the first external electronic device using the first network communication and control the WI-FI communication module 230 to have the sleep time of a second time.

According to an embodiment, a method performed by an electronic device comprises establishing a first network connection with a first external electronic device, identifying a first distance between the electronic device and the first external electronic device, identifying first state information about the first external electronic device, and controlling a reception module of a first communication module 230 to remain in a sleep state during a sleep time identified based on the first state information and the first distance.

According to an embodiment, the method may further comprise controlling the reception module of the first communication module 230 to be in a wake up state during a wakeup time which is a remaining time in a designated period except for the sleep time.

According to an embodiment, identifying the first state information may include identifying, as at least part of the first state information, the amount of data transmitted/received between the electronic device and the first external electronic device via the first network connection.

According to an embodiment, identifying the first distance may include identifying the first distance using a communication signal received via at least part of the communication module 190.

According to an embodiment, the first state information may include at least one of information indicating whether the first external electronic device is in the sleep state, movement information about the first external electronic device, information indicating the kind of an application running on the first external electronic device, or information indicating whether a user wearing the first external electronic device is asleep.

According to an embodiment, identifying the first state information may include, when the first distance is less than a threshold distance, controlling a second communication module 240 included in the communication module 190 to receive the first state information from the first external electronic device via a second network connection and, when the first distance is equal to or greater than the threshold distance, controlling the first communication module 230 to receive the first state information from the first external electronic device via the first network connection.

According to an embodiment, the threshold distance may correspond to a coverage range for the second network connection.

According to an embodiment, when the first distance between the electronic device and the first external electronic device is equal to or greater than the threshold distance, the sleep time may be equal to or less than a first time and, when the first distance between the electronic device and the first external electronic device is less than the threshold time, the sleep time may be equal to or less than a second time. The first time may be shorter than the second time.

According to an embodiment, the method may further comprise establishing the first network connection with at least one second external electronic device via the communication module 190, identifying at least one second distance between the electronic device and the at least one second external electronic device, and identifying at least one piece of second state information about the at least one second external electronic device. Controlling the reception module of the first communication module 230 to remain in the sleep state during the sleep time may include identifying the sleep time as a shortest one of a first sleep time identified by the first state information and the first distance and at least one second sleep time identified by the at least one piece of second state information and the at least one second distance.

According to an embodiment, the method may further comprise controlling the first communication module 230 to transmit a signal related to the first network connection to the first external electronic device using a first power identified based on the first distance.

According to an embodiment, the method may further comprise establishing the first network connection with at least one second external electronic device via the communication module 190, identifying at least one second distance between the electronic device and the at least one second external electronic device, and controlling the first communication module 230 to transmit a signal related to the first network connection to the first external electronic device and the at least one second external electronic device using a third power. The third power may be identified as a highest value of among the first power and at least one second power identified based on the at least one second distance.

According to an embodiment, the method may further comprise establishing the first network connection with at least one second external electronic device via the communication module 190, identifying at least one second distance between the electronic device and the at least one second external electronic device, and controlling the first communication module 230 to transmit a signal related to the first network connection to each of the at least one second external electronic device using at least one second power identified based on the at least one second distance.

According to an embodiment, a method performed by an electronic device 101 may comprise activating a WI-FI communication module 230 supporting first network communication based on activation of a mobile hotspot function, establishing a first network connection with a first external electronic device via the WI-FI communication module 230, measuring a distance between the electronic device and the first external electronic device, when the distance is equal to or less than a designated distance, controlling a BLE communication module 240 to receive state information about the first external electronic device using the second network communication and controlling a reception module of the WI-FI communication module 230 to have a sleep time of a first time based on the state information, and when the distance is less than the designated distance, controlling the WI-FI communication module 230 to receive the state information about the first external electronic device using the first network communication and control the WI-FI communication module 230 to have the sleep time of a second time.

It should be appreciated that various embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Various embodiments as set forth herein may be implemented as software (e.g., the program 140) containing commands that are stored in a machine (e.g., computer)—readable storage medium (e.g., an internal memory 136) or an external memory 138. The machine may be a device that may invoke a command stored in the storage medium and may be operated as per the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

As is apparent from the foregoing description, according to various embodiments, there are provided an electronic device for providing a mobile hotspot and a method of operating the electronic device to provide a mobile hotspot. Thus, the electronic device may control the reception module of the WI-FI communication module to remain in the sleep state based on, at least, the state of the client device and the distance from the client device. Thus, the electronic device may save power consumed by the reception module of the WI-FI communication module. According to an embodiment, the electronic device may adjust the transmission power of signals based on the distance from the client device, thus saving power consumed by the transmission module of the WI-FI communication module.

According to an embodiment, the electronic device may authenticate the client device via out-of-band (OOB) communication, automatically activating the mobile hotspot function without the need for the user's input. Thus, the user may conveniently establish a mobile hotspot connection.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
   a communication circuit; and
   at least one processor operably connected to the communication circuit, wherein the at least one processor is configured to:
   establish a first network connection with a first external electronic device via a first communication circuit of the communication circuit;
   identify a first distance between the electronic device and the first external electronic device;
   identify first state information about the first external electronic device;
   identify a sleep time of the first communication circuit based on the first state information and the first distance; and
   control the first communication circuit to be in a sleep state during the identified sleep time.

2. The electronic device of claim 1, wherein the at least one processor is configured to control the first communication circuit to be in a wake up state during a wakeup time that is a remaining time in a designated period except for the sleep time.

3. The electronic device of claim 1, wherein the at least one processor is configured to identify, as at least part of the first state information, an amount of data transmitted/received between the electronic device and the first external electronic device via the first network connection.

4. The electronic device of claim 1, wherein the at least one processor is configured to identify the first distance using a communication signal received via at least part of the communication circuit.

5. The electronic device of claim 1, wherein the first state information includes at least one of information indicating whether the first external electronic device is in the sleep state, movement information about the first external electronic device, information indicating a kind of an application running on the first external electronic device, or information indicating whether a user wearing the first external electronic device is asleep.

6. The electronic device of claim 1, wherein the at least one processor is configured to:
when the first distance is less than a threshold distance, control a second communication circuit included in the communication circuit to receive the first state information from the first external electronic device via a second network connection; and
when the first distance is equal to or greater than the threshold distance, control the first communication circuit to receive the first state information from the first external electronic device via the first network connection.

7. The electronic device of claim 6, wherein the threshold distance corresponds to a coverage range for the second network connection.

8. The electronic device of claim 6, wherein:
when the first distance between the electronic device and the first external electronic device is equal to or greater than the threshold distance, the sleep time is equal to or less than a first time;
when the first distance between the electronic device and the first external electronic device is less than the threshold distance, the sleep time is equal to or less than a second time; and
the first time is shorter than the second time.

9. The electronic device of claim 1, wherein the at least one processor is configured to:
establish the first network connection with at least one second external electronic device via the communication circuit;
identify at least one second distance between the electronic device and the at least one second external electronic device;
identify at least one piece of second state information about the at least one second external electronic device; and
identify the sleep time as a shortest one of a first sleep time identified by the first state information and the first distance and at least one second sleep time identified by the at least one piece of second state information and the at least one second distance.

10. The electronic device of claim 1, wherein the at least one processor is configured to control the first communication circuit to transmit a signal related to the first network connection to the first external electronic device using a first power identified based on the first distance.

11. The electronic device of claim 1, wherein the at least one processor is configured to:
establish the first network connection with at least one second external electronic device via the communication circuit;
identify at least one second distance between the electronic device and the at least one second external electronic device; and
control the first communication circuit to transmit a signal related to the first network connection to the first external electronic device and the at least one second external electronic device using a third power, and wherein the third power is identified as a highest value of among a first power and at least one second power identified based on the at least one second distance.

12. The electronic device of claim 1, wherein the at least one processor is configured to:
establish the first network connection with at least one second external electronic device via the communication circuit;
identify at least one second distance between the electronic device and the at least one second external electronic device; and
control the first communication circuit to transmit a signal related to the first network connection to each of the at least one second external electronic device using at least one second power identified based on the at least one second distance.

13. A method performed by an electronic device, the method comprising:
establishing a first network connection with a first external electronic device;
identifying a first distance between the electronic device and the first external electronic device;
identifying first state information about the first external electronic device;
identifying a sleep time of a first communication circuit based on the first state information and the first distance; and
controlling the first communication circuit configured to support the first network connection of the first communication circuit of the electronic device, to be in a sleep state during an identified sleep time.

14. The method of claim 13, further comprising controlling the first communication circuit to be in a wake up state during a wakeup time that is a remaining time in a designated period except for the sleep time.

15. The method of claim 13, wherein the first state information includes at least one of an amount of data transmitted/received between the electronic device and the first external electronic device via the first network connection, information indicating whether the first external electronic device is in the sleep state, movement information about the first external electronic device, or a kind of an application running on the first external electronic device.

16. The method of claim 13, wherein identifying the first distance includes identifying the first distance using a communication signal received via at least part of the first communication circuit.

17. The method of claim 13, wherein identifying the first state information includes:
When the first distance is less than a threshold distance, controlling a second communication circuit included in the first communication circuit to receive the first state information from the first external electronic device via a second network connection; and when the first distance is equal to or greater than the threshold distance, controlling the first communication circuit to receive the first state information from the first external electronic device via the first network connection.

18. The method of claim 13, wherein when the first distance between the electronic device and the first external electronic device is equal to or greater than a threshold distance, the sleep time is equal to or less than a first time and, when the first distance between the electronic device and the first external electronic device is less than the threshold distance, the sleep time is equal to or less than a second time, and wherein the first time is shorter than the second time.

19. The method of claim 13, further comprising controlling the first communication circuit to transmit a signal related to the first network connection to the first external electronic device using a first power identified based on the first distance.

20. An electronic device, comprising:
- a wireless-fidelity (WI-FI) communication circuit configured to support a first network communication;
- a BLUETOOTH low energy (BLE) communication circuit configured to support a second network communication; and
- at least one processor configured to:
  - activate the WI-FI communication circuit based on activation of a mobile hotspot function;
  - establish a first network connection with a first external electronic device via the Wi-Fi communication circuit;
  - measure a distance between the electronic device and the first external electronic device;
  - when the distance is equal to or less than a designated distance, control the BLE communication circuit to receive state information about the first external electronic device using the second network communication and control the WI-FI communication circuit to have a sleep time of a first time based on the state information; and
  - when the distance is greater than the designated distance, control the WI-FI communication circuit to receive the state information about the first external electronic device using the first network communication and control the WI-FI communication circuit to have the sleep time of a second time.

* * * * *